US012019142B2

(12) United States Patent
Nam et al.

(10) Patent No.: US 12,019,142 B2
(45) Date of Patent: Jun. 25, 2024

(54) FREQUENCY MODULATED CONTINUOUS WAVE RADAR SYSTEM

(71) Applicant: Infineon Technologies AG, Neubiberg (DE)

(72) Inventors: Sang Ho Nam, Yongin (KR); Mohit Berry, Munich (DE); Byung Kwon Park, Seongnam (KR)

(73) Assignee: Infineon Technologies AG, Neubiberg (DE)

(*) Notice: Subject to any disclaimer, the term of this patent is extended or adjusted under 35 U.S.C. 154(b) by 61 days.

(21) Appl. No.: 17/874,797

(22) Filed: Jul. 27, 2022

(65) Prior Publication Data

US 2022/0365196 A1 Nov. 17, 2022

Related U.S. Application Data

(63) Continuation of application No. 16/564,213, filed on Sep. 9, 2019, now Pat. No. 11,428,796.

(30) Foreign Application Priority Data

Sep. 10, 2018 (DE) .......................... 102018121987.3

(51) Int. Cl.
*G01S 13/536* (2006.01)
*G01S 7/35* (2006.01)
(Continued)

(52) U.S. Cl.
CPC .............. *G01S 13/536* (2013.01); *G01S 7/35* (2013.01); *G01S 13/343* (2013.01); *G01S 13/931* (2013.01); *G01S 7/356* (2021.05)

(58) Field of Classification Search
CPC ........ G01S 13/12; G01S 13/225; G01S 13/26; G01S 13/325; G01S 13/56; G01S 13/765;
(Continued)

(56) References Cited

U.S. PATENT DOCUMENTS 7,791,528 B2 9/2010 Klotzbuecher et al.
9,599,702 B1 3/2017 Bordes et al.
(Continued)

FOREIGN PATENT DOCUMENTS

CN 101957446 A 1/2011
CN 102224432 A 10/2011
(Continued)

*Primary Examiner* — Timothy A Brainard
(74) *Attorney, Agent, or Firm* — Harrity & Harrity, LLP

(57) ABSTRACT

A radar system includes first, second, and third transmitter branches. The first transmitter branch transmits a first frequency-modulated continuous wave (FMCW) signal having a first set of chirps having a first phase setting such that phase values of consecutive chirps differ by a first phase difference. The second transmitter branch transmits a second FMCW signal having a second set of chirps having a second phase setting such that phase values of consecutive chirps differ by a second phase difference. The third transmitter branch transmits a third FMCW signal having a third set of chirps having a third phase setting such that phase values of consecutive chirps differ by a third phase difference. The first phase difference, the second phase difference, and the third phase difference are different phase differences. The first phase difference, the second phase difference, and the third phase difference are asymmetrically distributed relative to each other.

20 Claims, 16 Drawing Sheets

(51) Int. Cl.
*G01S 13/34* (2006.01)
*G01S 13/931* (2020.01)

(58) Field of Classification Search
CPC .......... G01S 13/825; G01S 2013/0245; G01S 7/034; G01S 7/35; G01S 7/352; G01S 7/354

See application file for complete search history.

(56) References Cited

U.S. PATENT DOCUMENTS

| | | | |
|---|---|---|---|
| 9,748,837 B1* | 8/2017 | Kose | H02M 3/07 |
| 9,753,121 B1 | 9/2017 | Davis et al. | |
| 9,869,762 B1 | 1/2018 | Alland et al. | |
| 11,428,796 B2 | 8/2022 | Nam et al. | |
| 11,579,284 B2 | 2/2023 | Bharadwaj et al. | |
| 2006/0108767 A1 | 5/2006 | Susko | |
| 2008/0303711 A1 | 12/2008 | Matsuoka | |
| 2015/0061928 A1 | 3/2015 | Cornic et al. | |
| 2015/0097718 A1* | 4/2015 | Sato | H01Q 3/267 |
| | | | 342/147 |
| 2015/0323660 A1 | 11/2015 | Hampikian | |
| 2017/0082744 A1 | 3/2017 | Matsumoto et al. | |
| 2017/0115384 A1 | 4/2017 | Loesch et al. | |
| 2017/0131392 A1 | 5/2017 | Schoor et al. | |
| 2017/0131393 A1 | 5/2017 | Schoor et al. | |
| 2017/0254879 A1 | 9/2017 | Tokieda et al. | |
| 2017/0276769 A1 | 9/2017 | Kishigami | |
| 2017/0307729 A1 | 10/2017 | Eshraghi et al. | |
| 2017/0310507 A1 | 10/2017 | Bordes et al. | |
| 2018/0011170 A1 | 1/2018 | Rao et al. | |
| 2018/0088224 A1 | 3/2018 | Kishigami | |
| 2018/0172813 A1 | 6/2018 | Rao et al. | |
| 2019/0056478 A1 | 2/2019 | Millar | |
| 2019/0113602 A1* | 4/2019 | Matsumoto | G01S 13/584 |
| 2019/0317177 A1 | 10/2019 | Ertan et al. | |

FOREIGN PATENT DOCUMENTS

| | | |
|---|---|---|
| CN | 102866387 A | 1/2013 |
| CN | 108169736 A | 6/2018 |
| EP | 2202537 A2 | 6/2010 |
| EP | 3156817 A1 | 4/2017 |
| EP | 3179266 A1 | 6/2017 |
| EP | 3211445 A1 | 8/2017 |
| EP | 3324201 A1 | 5/2018 |
| WO | 2017050798 A1 | 3/2017 |
| WO | 2017187337 A1 | 11/2017 |
| WO | 2018069120 A1 | 4/2018 |
| WO | 2018104468 A1 | 6/2018 |
| WO | 2018115370 A1 | 6/2018 |

\* cited by examiner

Real Aperature

Synthesized Aperature

FREQUENCY MODULATED CONTINUOUS WAVE RADAR SYSTEM

CROSS-REFERENCE TO RELATED APPLICATIONS

This application is a continuation of U.S. patent application Ser. No. 16/564,213 filed Sep. 9, 2019, which claims the benefit of German Patent Application No. 102018121987.3 filed Sep. 10, 2018, which are incorporated by reference as if fully set forth.

FIELD

Embodiments of the present disclosure relate to a frequency modulated continuous wave (FMCW) radar system, more particularly a method and system for high resolution FMCW radar using multiple antennas.

BACKGROUND

Radar sensors are used to detect and recognize information for distance, velocity, and its angular position of a target(s). In order to obtain highly accurate angular information for a target (or between targets), a large number of receivers and receive antennas may be used. These large number of receivers/antennas require more hardware channels as large number of components and large antenna size are needed, thereby adding huge cost. For example, in automotive industry where radar sensors become an integral part of advanced driving assistance system (ADAS) and autonomous driving (AD), high performance yet small form factor and cost are needed for automotive radar sensors.

SUMMARY

This object is addressed by apparatuses and methods in accordance with the independent claims. Further embodiments which may be beneficial in some scenarios are addressed by the dependent claims.

According to a first aspect of the present disclosure it is provided a radar system. The radar system includes a waveform generator, a plurality of phase shifters, at least one mixer, an analog-to-digital converter, a fast Fourier transform (FFT) processing unit, and a processing unit. The waveform generator is configured to generate a frequency-modulated continuous wave (FMCW) signal. The FMCW signal includes a set of chirps repeated for a predetermined number of times, and the FMCW signal is forwarded to a plurality of transmit branches to be transmitted over a plurality of antennas simultaneously and to one or more receive branches for receive processing of the FMCW signal received after reflected off of a target. The plurality of phase shifters are configured to shift a phase of each chirp on at least one transmit branch. The phases transmitted via a first transmit branch are shifted in accordance with a first set of regularly spaced phases, and phases transmitted via a second transmit branch are shifted in accordance with a second set of regularly spaced phases. The first set of regularly spaced phases have first phase differences and the second set of regularly spaced phases have second phase differences. The first phase differences are different from the second phase differences. The at least one mixer is configured to down-convert a received signal on at least one antenna to generate an intermediate frequency signal. The analog-to-digital converter is configured to convert the intermediate frequency signal to a digital domain. The FFT processing unit is configured to perform first FFT processing on each chirp received on each antenna in the digital domain and perform second FFT processing on results of the first FFT processing over the set of chirps. The processing unit is configured to process an output of the FFT processing unit to determine an angle of direction of the target based on range Doppler map bins containing peaks with the first and second phase differences.

With the embodiments, a high angular resolution (e.g. 1° resolution or higher) may be obtained with a smaller number of components such as transmitters, receivers and antennas.

In some embodiments, the phases of each chirp transmitted via a third transmit branch are not phase-modulated.

In some embodiments, a velocity is determined by identifying a first peak in a range Doppler map corresponding to one predetermined transmit branch.

In some embodiments, the predetermined branch is a branch in which phases of each chirp are not phase-modulated.

In some embodiments, the phases of chirps on the transmit branches are shifted to incur a specific shift to peaks corresponding to different transmit branches in a Doppler domain after the second FFT processing.

In some embodiments, the specific shift incurred to the Doppler domain are asymmetric.

In some embodiments, a phase shift applied to the set of chirps on an antenna either monotonically changes or remains constant.

According to a second aspect of the present disclosure it is provided a method of detecting a target. The method includes generating an FMCW signal including a set of chirps repeated for a predetermined number of times, forwarding the FMCW signal to a plurality of transmit branches and to at least one receive branch, shifting a phase of each chirp on at least one transmit branch, wherein phases transmitted via a first transmit branch are shifted in accordance with a first set of regularly spaced phases and phases transmitted via a second transmit branch are shifted in accordance with a second set of regularly spaced phases, wherein the first set of regularly spaced phases have first phase differences and the second set of regularly spaced phases have second phase differences, wherein the first phase differences are different from the second phase differences, transmitting the FMCW signal after phase shifting over a plurality of antennas simultaneously, receiving the transmitted FMCW signal reflected off of a target, down-converting the received FMCW signal on at least one antenna to generate an intermediate frequency signal, converting the intermediate frequency signal to a digital domain, performing first FFT processing on each chirp on each antenna in the digital domain and second FFT processing on results of the first FFT processing over the set of chirps, and processing an output of the FFT processing to determine an angle of direction of the target based on range Doppler map bins containing peaks with the first and second phase differences.

According to yet a first aspect of the present disclosure, it is provided a radar system including means for generating an FMCW signal including a set of chirps repeated for a predetermined number of times, means for forwarding the FMCW signal to a plurality of transmit branches and to at least one receive branch, means for shifting a phase of each chirp on at least one transmit branch, wherein phases transmitted via a first transmit branch are shifted in accordance with a first set of regularly spaced phases and phases transmitted via a second transmit branch are shifted in accordance with a second set of regularly spaced phases, wherein the first set of regularly spaced phases have first phase differences and the second set of regularly spaced phases have second phase differences, wherein the first phase differences are different from the second phase differences, means for transmitting the FMCW signal after phase shifting over a plurality of antennas simultaneously, means for receiving the transmitted FMCW signal reflected off of a target, means for down-converting the received FMCW signal on at least one antenna to generate an intermediate frequency signal, means for converting the intermediate frequency signal to a digital domain, means for performing first FFT processing on each chirp on each antenna in the digital domain and second FFT processing on results of the first FFT processing over the set of chirps, and means for processing an output of the FFT processing to determine an angle of direction of the target based on range Doppler map bins containing peaks with the first and second phase differences.

BRIEF DESCRIPTION OF THE DRAWINGS

Some embodiments of apparatuses and/or methods will be described in the following by way of example only, and with reference to the accompanying figures, in which.

DETAILED DESCRIPTION

Figure 1:
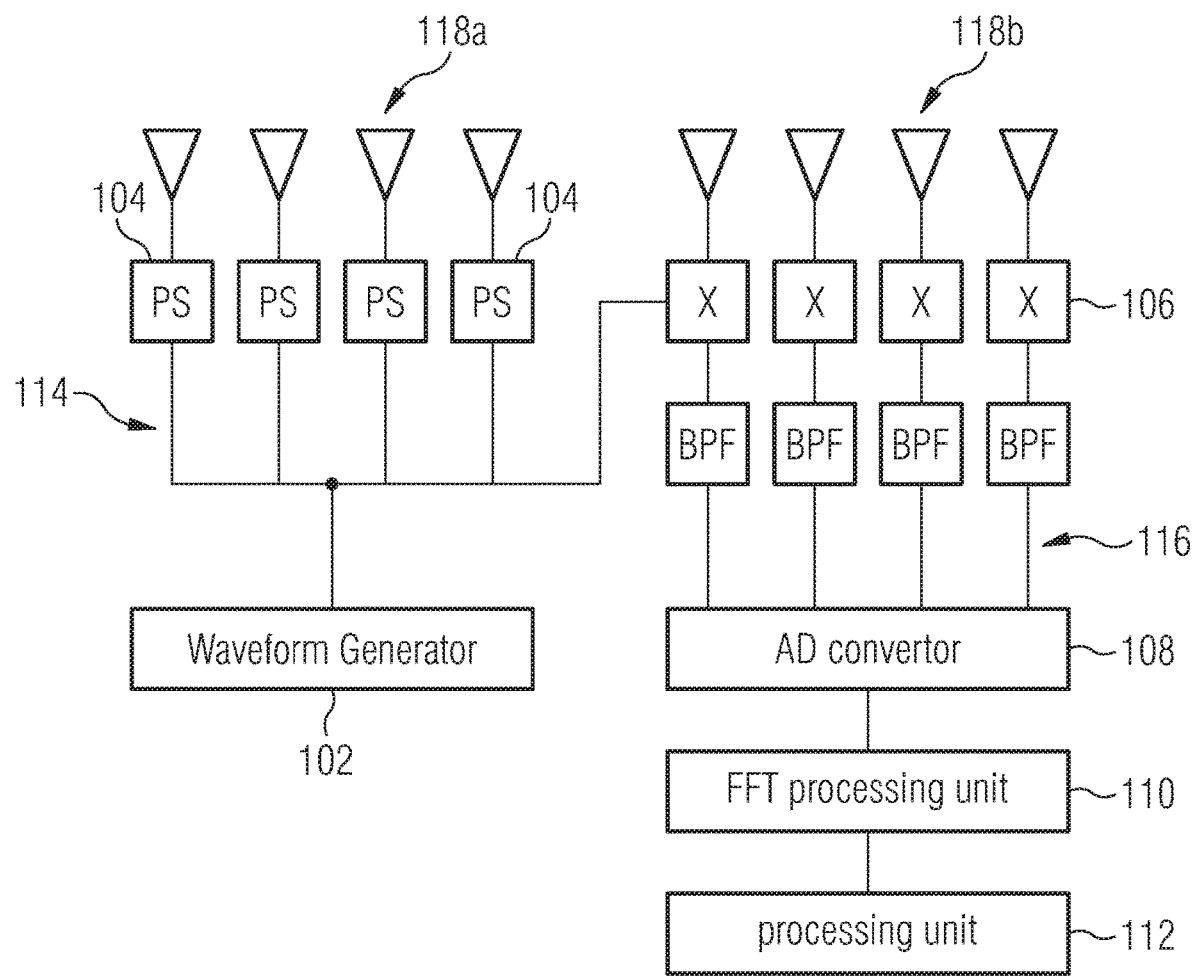
FIG. 1 is a diagram of a radar system in accordance with one embodiment.

Various embodiments will now be described more fully with reference to the accompanying drawings in which some embodiments are illustrated. In the figures, the thicknesses of lines, layers and/or regions may be exaggerated for clarity.

Accordingly, while further embodiments are capable of various modifications and alternative forms, some particular embodiments thereof are shown in the figures and will subsequently be described in detail. However, this detailed description does not limit further embodiments to the particular forms described. Further embodiments may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 elements.

The terminology used herein for the purpose of describing particular embodiments is not intended to be limiting for further embodiments. Whenever a singular form such as "a," "an" and "the" is used and using only a single element is neither explicitly or implicitly defined as being mandatory, further embodiments may also use plural elements to implement the same functionality. Likewise, when a functionality is subsequently described as being implemented using multiple elements, further embodiments may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the embodiments belong.

In order to obtain a high angular resolution of radar, a narrow beam width is needed, which generally needs a large number of receivers and antennas. The large number of receivers and antennas increases the antenna aperture size but also increases cost.

Multiple input multiple output (MIMO) is used for radar to enlarge effective radar aperture size by synthesizing a virtual receiver array by combination of physically implemented multiple transmitters and/or multiple receivers. In order to synthesize a virtual array from a physical array of antennas, separation of reflected signals received at each receiver from different transmitters is needed in MIMO technology. In addition, identification of corresponding transmitters of every reflected signal is also needed in each receiver. These limitations may be mitigated by post processing which includes phase compensation or tracking. However, these approaches add more development and hardware cost which makes these techniques unrealistic for a radar in application of ADAS and autonomous driving.

Different MIMO techniques have been used or proposed for a high resolution radar. One example MIMO approach in automotive radar industry is time multiplexing (i.e. time division multiple access (TDMA). In TDMA, transmitters are enabled one at a time. For example, a first transmitter is activated while others are deactivated followed by activation of a second one with deactivation of others, and so on. Signals in each receiver, which are reflection from surroundings associated with different transmitters, can be separated by its interleaved operating time. This time gap between each transmitter, however, leads to phase errors due to deviation of targets' position derived from its relative velocities. This further requires additional phase compensation process before synthesizing a virtual array, longer observing time and memory, smaller unambiguous Doppler range, and phase error between time gap. The TDMA scheme also requires more acquisition time and memory leading to substantial development time, testing and validation thereby increasing the overall system cost.

Different MIMO approaches have been used to mitigate this phase error in time multiplexing MIMO. Frequency division multiplexing is an alternative, where different offset frequency is added in each transmitter. In other words, signals caused from different transmitters can be isolated by the frequency distance due to frequency offset in modulation. However, it has challenges faced to put different offset frequencies in each transmitter due to modulation bandwidth limitation available for ATV radar.

Orthogonal frequency division multiplexing (OFDM) is another alternative. The OFDM modulation requires correlators in every receiver to output cross correlation between the local oscillator and the receiving signals. It also has drawbacks of extremely complex configuration in each receiver as well as a high-speed analog-to-digital converter (ADC) sampling rate to cover a full receiving bandwidth. This leads to high complexity and cost which is not feasible in current state of automotive radar industry.

Binary phase modulation (binary phase shift keying (BPSK)) is another possible approach for automotive radar. Binary phase modulation can be applied to MIMO to separate signals in Doppler frequency domain while multiple transmitters are activated at the same time. In BPSK MIMO, deployable frequency shifts in Doppler domain are limited, and additional signal processing is required to arrange signals in proper transmitters. Thus, MIMO with binary phase modulation is difficult to expand to the large number of transmitters.

Embodiments herein disclose a new concept for a high resolution radar system with high angular resolution. The example radar system disclosed herein may be used to obtain a high definition image for autonomous driving or any other applications.

Embodiments are disclosed for a method and system for MIMO-based FMCW radar by using specific phase modulation scheme to separate signals from different round trip traveling channels and identification of corresponding transmitters at the receivers to ameliorate phase error and hence realize high performance radar in a cost-effective way. The signal processing stage to arrange separated signals from all different transmitters to the corresponding transmitters is also disclosed to complete a large virtual array synthesis for high angular resolution radars.

In embodiments, phase-modulated MIMO is used to separate reflected signals originated from different multiple transmitters and post-signal processing is performed to arrange separated signals to proper virtual arrays.

FIG. 1 is a diagram of a radar system 100 in accordance with one embodiment. The radar system 100 includes a waveform generator 102, a plurality of phase shifters 104, at least one mixer 106, an analog-to-digital converter (ADC) 108, a fast Fourier transform (FFT) processing unit 110, and a processing unit 112.

Figure 2:
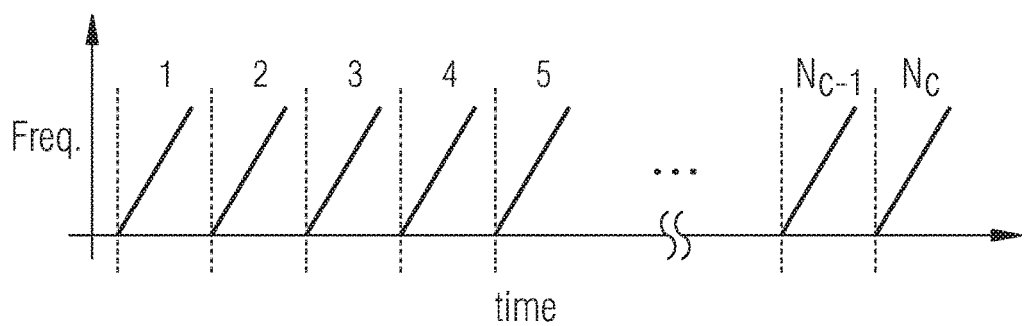
FIG. 2 shows an example FMCW waveform including a set of chirps.

The waveform generator 102 is configured to generate a frequency-modulated continuous wave (FMCW) signal. The FMCW signal includes a set of chirps repeated for a predetermined number of times. FIG. 2 shows an example FMCW waveform including a set of chirps. A chirp is a signal in which the frequency increases or decreases with time. $N_C$ is the total number of chirps in the FMCW waveform (e.g. $N_C$=256).

The FMCW signal is forwarded to a plurality of transmit branches 114 to be transmitted over a plurality of antennas 118a simultaneously and to one or more receive branches 116 for receive processing of the FMCW signal received via one or more antennas 118b after reflected off of a target. In FIG. 1, four (4) transmit branches 114 (or transmitters) and four (4) receive branches 116 (or receivers) are shown for transmission and reception via four antennas 118a/118b as an example. The antennas 118a/118b for transmission and reception may be separate antennas or may be reciprocal and same. The number of transmit and receive branches 114/116 (or transmitters and receivers) and transmit and receive antennas 118a/118b are not limited to any specific number but any number of transmit/receive branches 114/116 and antennas 118a/118b may be used. The terms "transmitter" and "transmit branch" and the terms "receiver" and "receive branch" will be used interchangeably, respectively.

The plurality of phase shifters 104 are configured to shift a phase of each chirp on the transmit branches. The chirps on one transmit branch may be transmitted without phase shift (i.e. zero shift). The phase shifters 104 may shift a phase of the chirps on different transmit branches by a different amount. For example, the phases of chirps transmitted via a first transmit branch are shifted in accordance with a first set of regularly spaced phases, and phases of chirps transmitted via a second transmit branch are shifted in accordance with a second set of regularly spaced phases. The first set of regularly spaced phases may have first phase differences, and the second set of regularly spaced phases may have second phase differences. The first phase differences are different from the second phase differences. Thus, in embodiments, phases of pairs of chirps transmitted directly consecutive on the first transmit branch differ by a same fixed first phase difference and phases of chirps transmitted directly consecutive on the second transmit branch differ by a same fixed second phase difference.

The at least one mixer 106 is configured to down-convert a received signal using a local oscillator signal on at least one antenna to generate an intermediate frequency (IF) signal. After filtering by bandpass filter, the ADC 108 is configured to convert the intermediate frequency signal to a digital domain.

The FFT processing unit 110 is configured to perform first FFT processing on each chirp received on each antenna in the digital domain and perform second FFT processing on results of the first FFT processing over the set of chirps. The processing unit 112 is configured to process an output of the FFT processing unit 110 to determine an angle of direction of the target based on range Doppler map bins containing peaks with the first and second phase differences.

The phase shifters 104 on the transmit branches 114 add phase delay independently thus providing intended phase coding or modulation to the transmitted chirps. The phase shifters 104 change the initial phase of corresponding chirps.

Figure 3:
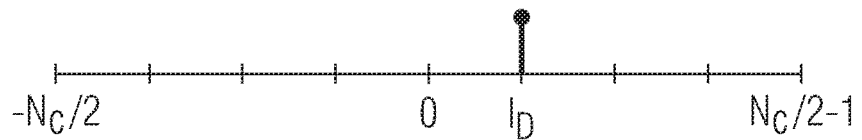
FIG. 3 shows the effect of this phase modulation.

In one embodiment, an equal distance phase modulation vector set may be designed and applied to corresponding chirps in the FMCW waveform. Each element of a phase modulation vector is applied to a corresponding chirp in an FMCW waveform to shift the phase of the chirp. FIG. 3 shows the effect of this phase modulation in the Doppler domain. $I_D$ is the frequency index (FFT bin after the second FFT processing) of a peak due to phase modulation. The phase distance between adjacent vector elements in a phase modulation vector is defined as $PD_{ID}$ for a certain index, $I_D$, and may be obtained by:

$$PD_{ID}=360/N_C \times I_D. \quad \text{Equation (1)}$$

The phase modulation vector elements applied to the chirps of an FMCW waveform on a transmit branch are 0, $PD_{ID}$, $2PD_{ID}$, $3PD_{ID}$, ... $(N_C-1)PD_{ID}$. Thus, for this transmit branch the first chirp of a frame is transmitted with a phase shift corresponding to the first element of the phase modulation vector (e.g. 0), the second chirp of the frame is transmitted with a phase shift corresponding to the second element of the phase modulation vector (e.g. $PD_{ID}$), the third chirp of the frame is transmitted with a phase shift corresponding to the third element of the phase modulation vector (e.g. $2PD_{ID}$) and the Nth chirp of the frame is transmitted with a phase shift corresponding to the Nth element of the phase modulation vector (e.g. $(N_C-1)PD_{ID}$). For each of the multiple transmitter branches, the chirps are transmitted with a phase shifts in accordance with the elements of the respective phase modulation vector corresponding to the respective transmit branch. To minimize spectral leakage, the absolute value of integer $I_D$ may be chosen to be less than $N_C/2$. Alternatively, floating number $I_D$ less than $N_C/2$ may be chosen to generate a desired frequency shift. A phase distance between modulation vector elements in a phase modulation vector set is constant and depends on $N_C$ and $I_D$. Table 1 shows a generic form of phase modulation vector.

TABLE 1

| $I_C$ | 1 | 2 | 3 | 4 | 5 | 6 | 7 | 8 | 9 | 10 | 11 | ... | $N_C$ |
|---|---|---|---|---|---|---|---|---|---|---|---|---|---|
| Phase shifting value | 0 | $PD_{ID}$ | $2PD_{ID}$ | $3PD_{ID}$ | $4PD_{ID}$ | $5PD_{ID}$ | $6PD_{ID}$ | $7PD_{ID}$ | $8PD_{ID}$ | $9PD_{ID}$ | $10PD_{ID}$ | ... | $(N_C - 1)PD_{ID}$ |

A phase modulation vector may be periodically self-concatenated. A phase modulation vector may be set with a specific length, $N_P$, less than the total number of chirps ($N_C$) in the waveform and this phase modulation vector may be self-concatenated to make a length of $N_C$ which is the same number of chirps in the FMCW waveform. Each element of the phase modulation vector is added to a starting phase of corresponding chirps in an FMCW waveform. The phase distance between elements in a respective phase modulation vector with respect to the amount of vectors used is provided in Table 2.

TABLE 2

| | # of phase modulation vector | | | | | |
|---|---|---|---|---|---|---|
| | 1 | 2 | 3 | 4 | 5 | 6 ... |
| Phase distance between elements | 360° | 180° | 120° | 90° | 72° | 60° ... |

Some examples of phase modulation vectors are shown in Table 3 and Table 4. Table 3 is for the positive interval or counter clockwise phase incremental vectors, while Table 4 is for the negative interval or clockwise phase incremental vectors. The set of phase modulation vectors applied to different transmitters/transmit branches may be a combination of any of $N_P$ from Table 3 and Table 4.

TABLE 3

| | | | $I_C$ | 1 | 2 | 3 | 4 | 5 | 6 | 7 | 8 |
|---|---|---|---|---|---|---|---|---|---|---|---|
| Np | 1 | PP1 | | $\Phi_{O1}$ | $\Phi_{O1}$ | $\Phi_{O1}$ | $\Phi_{O1}$ | $\Phi_{O1}$ | $\Phi_{O1}$ | $\Phi_{O1}$ | $\Phi_{O1}$ |
| | 2 | PP2 | | $\Phi_{O2}$ | $\Phi_{O2}$ + 180 | $\Phi_{O2}$ | $\Phi_{O2}$ + 180 | $\Phi_{O2}$ | $\Phi_{O2}$ + 180 | $\Phi_{O2}$ | $\Phi_{O2}$ + 180 |
| | 3 | PP3 | | $\Phi_{O3}$ | $\Phi_{O3}$ + 120 | $\Phi_{O3}$ + 240 | $\Phi_{O3}$ | $\Phi_{O3}$ + 120 | $\Phi_{O3}$ + 240 | $\Phi_{O3}$ | $\Phi_{O3}$ + 120 |
| | 4 | PP4 | | $\Phi_{O4}$ | $\Phi_{O4}$ + 90 | $\Phi_{O4}$ + 180 | $\Phi_{O4}$ + 270 | $\Phi_{O4}$ | $\Phi_{O4}$ + 90 | $\Phi_{O4}$ + 180 | $\Phi_{O4}$ + 270 |
| | 5 | PP5 | | $\Phi_{O5}$ | $\Phi_{O5}$ + 72 | $\Phi_{O5}$ + 144 | $\Phi_{O5}$ + 216 | $\Phi_{O5}$ + 288 | $\Phi_{O5}$ | $\Phi_{O5}$ + 72 | $\Phi_{O5}$ + 144 |
| | 6 | PP6 | | $\Phi_{O6}$ | $\Phi_{O6}$ + 60 | $\Phi_{O6}$ + 120 | $\Phi_{O6}$ + 180 | $\Phi_{O6}$ + 240 | $\Phi_{O6}$ + 300 | $\Phi_{O6}$ | $\Phi_{O6}$ + 60 |

| | | | $I_C$ | 9 | 10 | 11 | 12 | 13 | ... |
|---|---|---|---|---|---|---|---|---|---|
| Np | 1 | PP1 | | $\Phi_{O1}$ | $\Phi_{O1}$ | $\Phi_{O1}$ | $\Phi_{O1}$ | $\Phi_{O1}$ | ... |
| | 2 | PP2 | | $\Phi_{O2}$ | $\Phi_{O2}$ + 180 | $\Phi_{O2}$ | $\Phi_{O2}$ + 180 | $\Phi_{O2}$ | ... |
| | 3 | PP3 | | $\Phi_{O3}$ + 240 | $\Phi_{O3}$ | $\Phi_{O3}$ + 120 | $\Phi_{O3}$ + 240 | $\Phi_{O3}$ | ... |
| | 4 | PP4 | | $\Phi_{O4}$ | $\Phi_{O4}$ + 90 | $\Phi_{O4}$ + 180 | $\Phi_{O4}$ | $\Phi_{O4}$ + 90 | ... |
| | 5 | PP5 | | $\Phi_{O5}$ + 216 | $\Phi_{O5}$ + 288 | $\Phi_{O5}$ | $\Phi_{O5}$ + 72 | $\Phi_{O5}$ + 144 | ... |
| | 6 | PP6 | | $\Phi_{O6}$ + 120 | $\Phi_{O6}$ + 180 | $\Phi_{O6}$ + 240 | $\Phi_{O6}$ + 300 | $\Phi_{O6}$ | ... |

TABLE 4

| | | | $I_C$ | 1 | 2 | 3 | 4 | 5 | 6 | 7 | 8 |
|---|---|---|---|---|---|---|---|---|---|---|---|
| Np | 1 | PN1 | | $\Phi_{O1}$ | $\Phi_{O1}$ | $\Phi_{O1}$ | $\Phi_{O1}$ | $\Phi_{O1}$ | $\Phi_{O1}$ | $\Phi_{O1}$ | $\Phi_{O1}$ |
| | 2 | PN2 | | $\Phi_{O2}$ | $\Phi_{O2}$ − 180 | $\Phi_{O2}$ | $\Phi_{O2}$ − 180 | $\Phi_{O2}$ | $\Phi_{O2}$ − 180 | $\Phi_{O2}$ | $\Phi_{O2}$ − 180 |
| | 3 | PN3 | | $\Phi_{O3}$ | $\Phi_{O3}$ − 120 | $\Phi_{O3}$ − 240 | $\Phi_{O3}$ | $\Phi_{O3}$ − 120 | $\Phi_{O3}$ − 240 | $\Phi_{O3}$ | $\Phi_{O3}$ − 120 |
| | 4 | PN4 | | $\Phi_{O4}$ | $\Phi_{O4}$ − 90 | $\Phi_{O4}$ − 180 | $\Phi_{O4}$ − 270 | $\Phi_{O4}$ | $\Phi_{O4}$ − 90 | $\Phi_{O4}$ − 180 | $\Phi_{O4}$ − 270 |
| | 5 | PN5 | | $\Phi_{O5}$ | $\Phi_{O5}$ − 72 | $\Phi_{O5}$ − 144 | $\Phi_{O5}$ − 216 | $\Phi_{O5}$ − 288 | $\Phi_{O5}$ | $\Phi_{O5}$ − 72 | $\Phi_{O5}$ − 144 |
| | 6 | PN6 | | $\Phi_{O6}$ | $\Phi_{O6}$ − 60 | $\Phi_{O6}$ − 120 | $\Phi_{O6}$ − 180 | $\Phi_{O6}$ − 240 | $\Phi_{O6}$ − 300 | $\Phi_{O6}$ | $\Phi_{O6}$ − 60 |

| | | | $I_C$ | 9 | 10 | 11 | 12 | 13 | ... |
|---|---|---|---|---|---|---|---|---|---|
| Np | 1 | PN1 | | $\Phi_{O1}$ | $\Phi_{O1}$ | $\Phi_{O1}$ | $\Phi_{O1}$ | $\Phi_{O1}$ | ... |
| | 2 | PN2 | | $\Phi_{O2}$ | $\Phi_{O2}$ − 180 | $\Phi_{O2}$ | $\Phi_{O2}$ − 180 | $\Phi_{O2}$ | ... |
| | 3 | PN3 | | $\Phi_{O3}$ − 240 | $\Phi_{O3}$ | $\Phi_{O3}$ − 120 | $\Phi_{O3}$ − 240 | $\Phi_{O3}$ | ... |
| | 4 | PN4 | | $\Phi_{O4}$ | $\Phi_{O4}$ − 90 | $\Phi_{O4}$ − 180 | $\Phi_{O4}$ | $\Phi_{O4}$ − 90 | ... |
| | 5 | PN5 | | $\Phi_{O5}$ − 216 | $\Phi_{O5}$ − 288 | $\Phi_{O5}$ | $\Phi_{O5}$ − 72 | $\Phi_{O5}$ − 144 | ... |
| | 6 | PN6 | | $\Phi_{O6}$ − 120 | $\Phi_{O6}$ − 180 | $\Phi_{O6}$ − 240 | $\Phi_{O6}$ − 300 | $\Phi_{O6}$ | ... |

Each transmitting waveform on each antenna is modulated with one of pre-defined phase modulation vectors, for example the phase modulation vectors shown in Table 3 and Table 4. The phase-modulated waveform is radiated into the space through the antennas 118. The transmitted signals are reflected from surrounding objects and return to the receiver.

Figure 4:
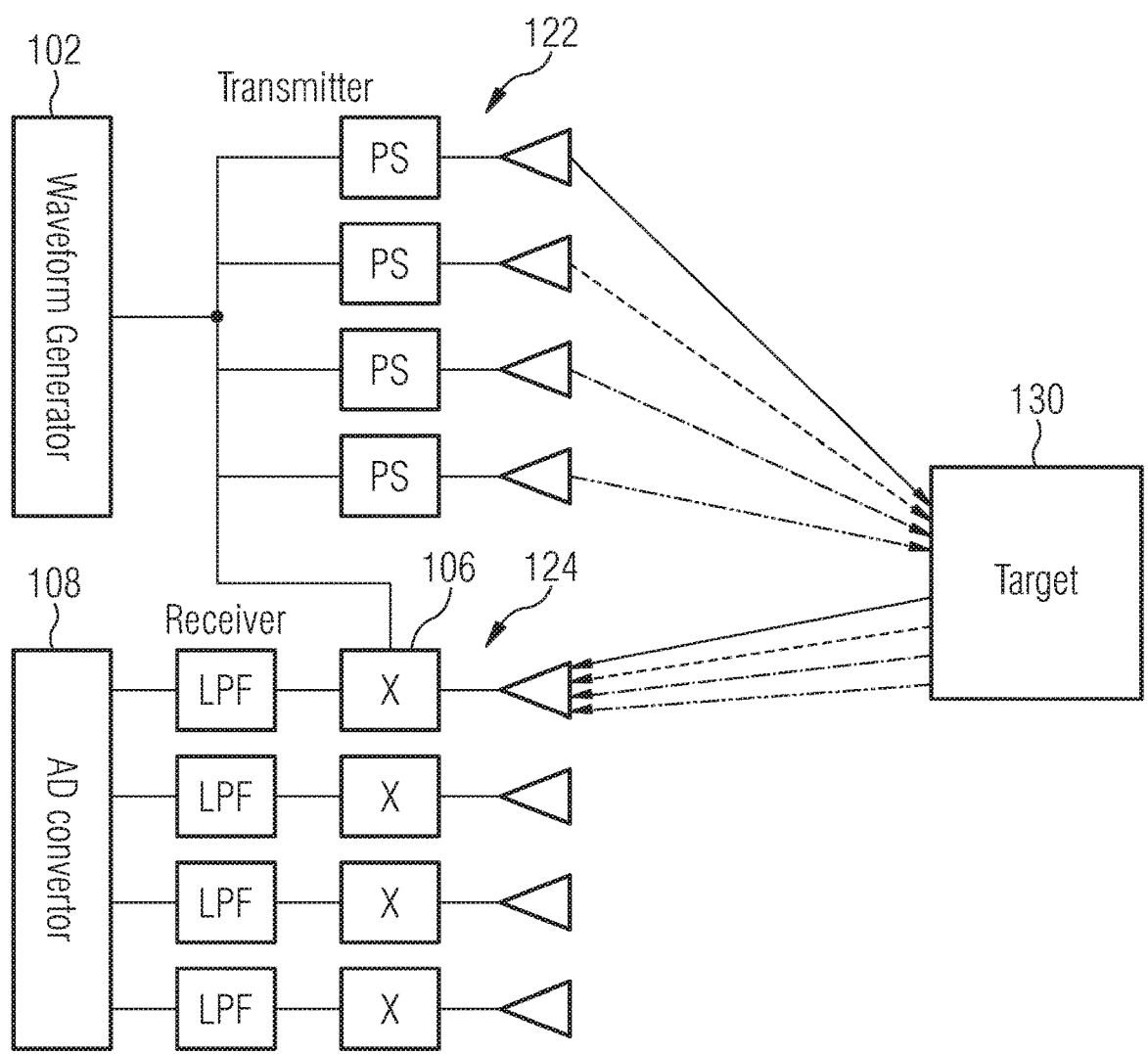
FIG. 4 shows transmission and reception of a waveform.

FIG. 4 shows transmission and reception of a waveform. In FIG. 4, four transmitters 122 and one receiver 124 are used as an example, but any number of transmitters and any number of receivers may be used. The receiver 124 receives a combined signal of the transmitted signals from multiple transmit antennas 122 reflected off of a target 130. The received signals are multiplied (mixed) with a reference signal which may be for example the non-phase shifted signal (original waveform signal). Thereby the received signal is converted to an intermediate frequency (IF) signal. The IF signal is provided to an analog-to-digital converter 108 to obtain a set of samples for each received chirp signal. Signals associated with a particular transmitter in each received data can be separated by signal processing which will be explained in detail below.

Two FFT processing may be performed for the radar with the waveform that includes multiple chirps. The term "FFT" will be used inclusive of discrete Fourier transform (DFT) processing. The first FFT processing is performed on the samples of each chirp to extract a frequency component from the temporal data of the IF signal corresponding to each chirp. It is called "Range Processing" since frequency index of the FFT results represents for the distance between a radar and scatters (e.g. targets). The second FFT processing is performed on the results of the first FFT processing along the chirps in the FMCW waveform to get a phase cycle of corresponding range bin which is output of the first FFT processing. It is called "Doppler Processing" since its frequency index represents for the relative velocity between radar and scatters.

Figure 5:
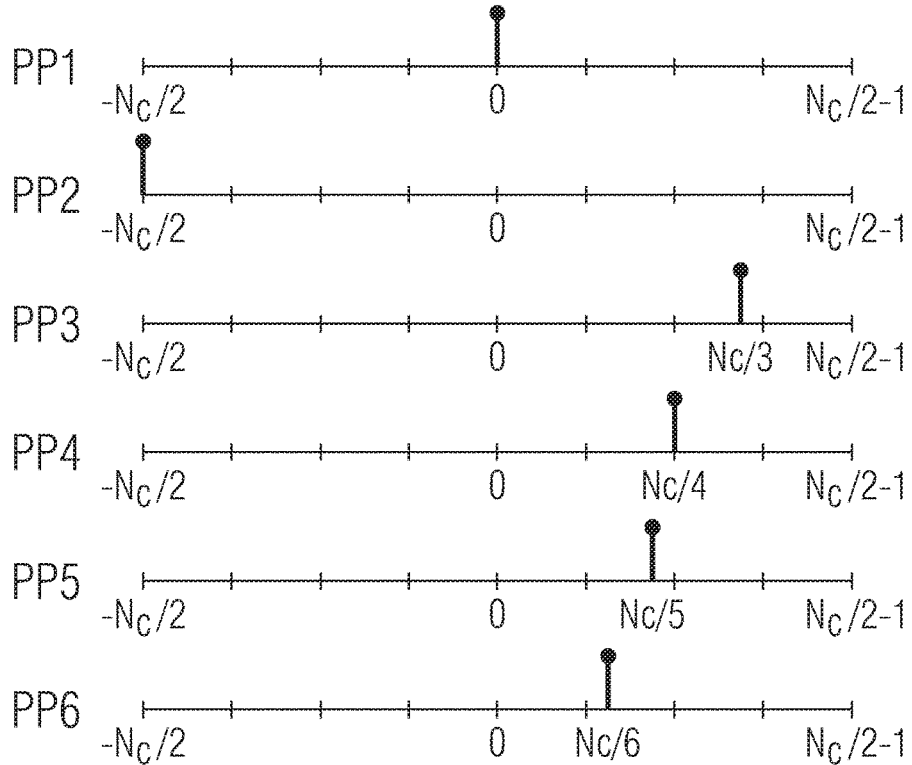
FIGS. 5 and 6 show the effects of the phase modulation.
Figure 6:
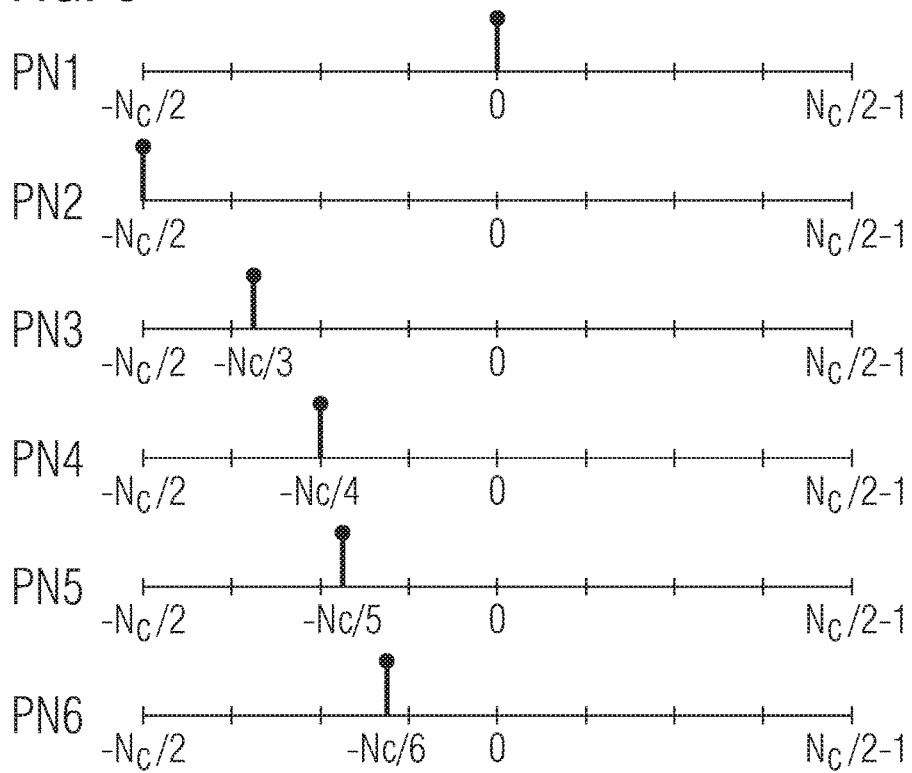

A signal from each transmitter may be separated from the outputs of the second FFT processing. FIGS. 5 and 6 show the effects of the phase modulation in the Doppler domain according to the phase modulation vector in Tables 3 and 4, respectively. In FIGS. 5 and 6, the phase shifting effect is shown after the second FFT processing associated with the phase modulation vectors in Tables 3 and 4, respectively. As a result of the phase modulation, the original frequency indexes in the results of the second FFT processing obtained from scatters are shifted according to the phase shift effect as shown in FIGS. 5 and 6. For example, if 4 transmitters are used with different phase modulation vectors, peaks will appear in the Doppler domain at 4 different frequency indexes after the second FFT processing from the same range FFT bin.

Figure 7:
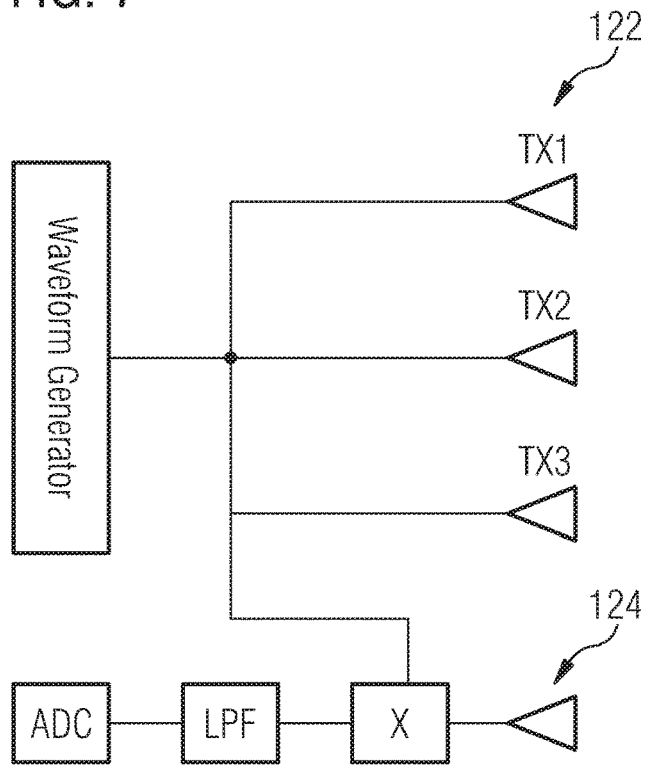
FIG. 7 is an example structure of a radar system with three transmitters and one receiver.
Figure 8:
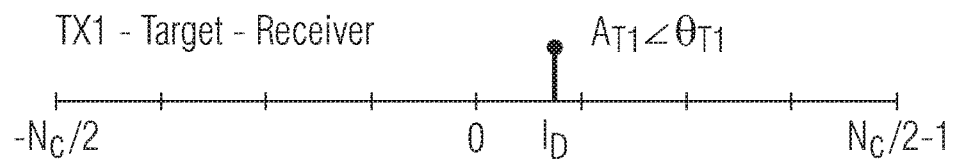
FIG. 8 shows the outputs of the second FFT processing in the three channels in case no phase-modulation is performed.
Figure 8:
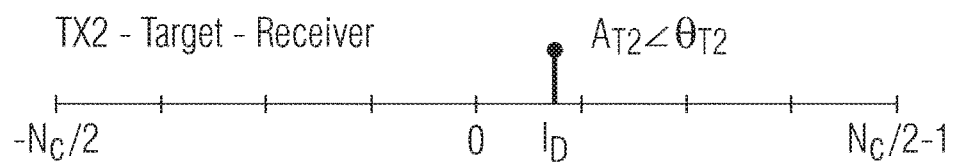
Figure 8:
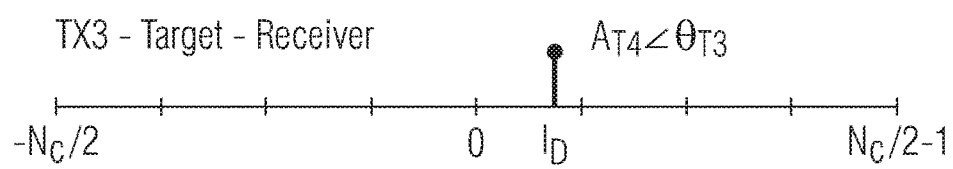
Figure 9:
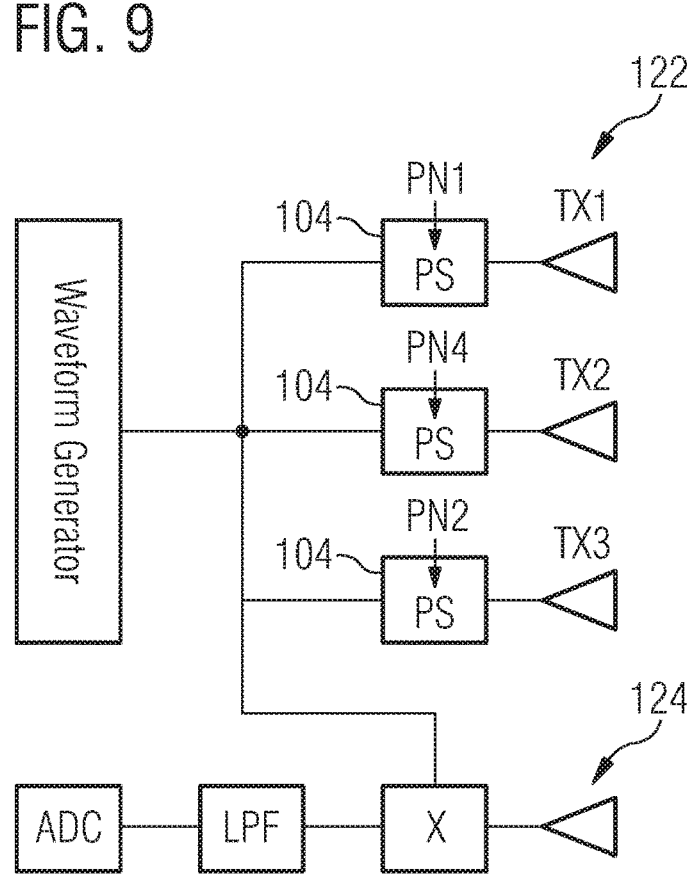
FIG. 9 shows an example structure of a radar system with three transmitters and one receiver.
Figure 10:
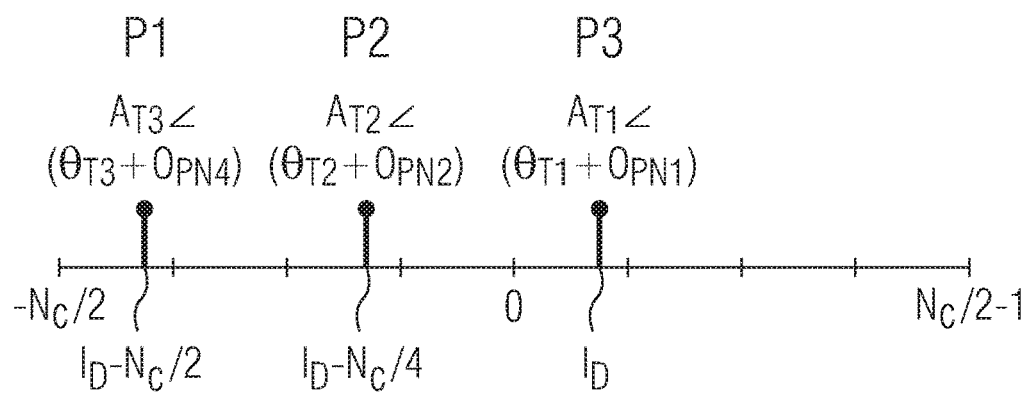
FIG. 10 shows the result after second FFT processing with configuration shown in FIG. 9.

FIGS. 7 to 10 illustrate the concept of separation in Doppler domain for radar systems with three transmitters 122 and one receiver 124. FIGS. 7 and 8 shows a radar system and the obtained results when no phase modulation is applied to the transmit branches while FIGS. 9 and 10 show a radar system and the obtained results when phase modulation in accordance with embodiments is applied. As can be seen from FIG. 7, three different channels of round trip paths are formed in line of sight. First is TX1 to target to receiver, second is TX2 to target to receiver, and third is TX3 to target to receiver. The transmitters 122 in FIG. 7 transmit the waveform simultaneously without phase modulation. FIG. 8 shows the outputs of the second FFT processing in the three channels in case no phase-modulation is performed. The relative radial velocity of target can be obtained from the frequency index of its peak signal. Complex information of the second FFT processing outputs associated with each transmitter needs to be identified or differentiated from each other for proper allocation of received signals to synthesize the virtual antenna array. However, if three different transmitters transmit at the same time without any phase modulation, the target from different channels lies on the same frequency bin thus providing a mixture of outputs rather than separated individual ones. In other words, all the outputs are super imposed with or distorted to each other due to the three concurrent outputs, consequently cannot properly synthesize the virtual MIMO array.

FIG. 9 shows an example structure of a radar system with three transmitters 122 and one receiver 124 as an example. The transmitters 122 in FIG. 9 transmit the waveform simultaneously with phase modulation. In the system in FIG. 9, each transmitter 122 has a phase shifter 104 before the antenna 118a and transmits signals with a different phase modulation generated from the phase shifter 104. Each phase shifter 104 changes the initial phase of every chirp in the FMCW waveform according to the phase modulation vector. In this example, the set of phase modulation vectors to TX1, TX2, and TX3 are PN1, PN4, and PN2 in Table 3, respectively. Other configurations are the same with the one in FIG. 7. FIG. 10 shows the result after the second FFT processing with the configuration shown in FIG. 9. Even though all transmitters 122 are activated at the same time for simultaneous transmission, signals are separated in the second FFT domain as shown in FIG. 10. This is because of the additional phase components introduced by the phase modulation applied to the FMCW waveforms in different transmitters 122. Consequently, the signals after the second FFT processing can be identified as corresponding to their originated transmitter. This makes it possible to construct a virtual array. Initial constant and fixed residual phase might be added to the signals due to phase modulation vectors, but it can be calibrated in digital domain together with other calibrations such as compensation of transmission line loss, delay, or the like.

Since all transmitters are operating concurrently, no additional processing is needed such as phase compensation caused by target's relative velocity associated with time gap between interleaving operations of each transmitter. Furthermore, since no interleaved chirps are required for temporal separation between different Tx, neither reduction of Doppler unambiguity zone nor increase of memory size occurs comparing to the time multiplexing MIMO.

The separated signals in the second FFT processing may be allocated to the associated transmitter. Phase modulation with phase modulation vectors having elements with constant phase differences results in the additional frequency shift in the Doppler range map. The frequency shift along the Doppler dimension depends on the phase difference of the elements assigned to the respective phase modulation vector. Since the phase differences for each set are chosen to be different, separation in the Doppler domain can be achieved. To this end, the radar system in FIG. 9 includes three transmitters 122 and one receiver 124 with phase shifters 104 for the phase modulation with PN1, PN4, and PN2, as an example. The result of frequency shift after the second FFT processing is shown in FIG. 10. As a result, an index distance between the peaks for TX1 and TX2 is $-N_C/4$, while distance between the peaks for TX2 and TX3 is $-N_C/4$. If P1 is assumed as a reflected signal associated with TX1, the index for the peak corresponding to TX2 should be $I_D-N_C/2-N_C/4$. Furthermore, the index for the TX3 peak should be $I_D-N_C/2-N_C/2$. If the desired index values exceed the domain interval, the remaining components for $N_C$ should be considered to compensate ambiguity. If no peak occurs at the expected index the initial assumption that P1 is from TX1 is assumed to be not valid. Then, P2 or P3 is assumed as the one from TX1 to find indexes that meet the expectation. After two peaks are found in each desired index, P3, P2, and P1 are allocated to TX1, TX2 and TX3. Thus, a method to allocate peaks to respective TX channels includes matching distances between peaks in the Doppler domain to respective phase differences used in the phase modulation vectors assigned to the TX channels.

Figure 11:
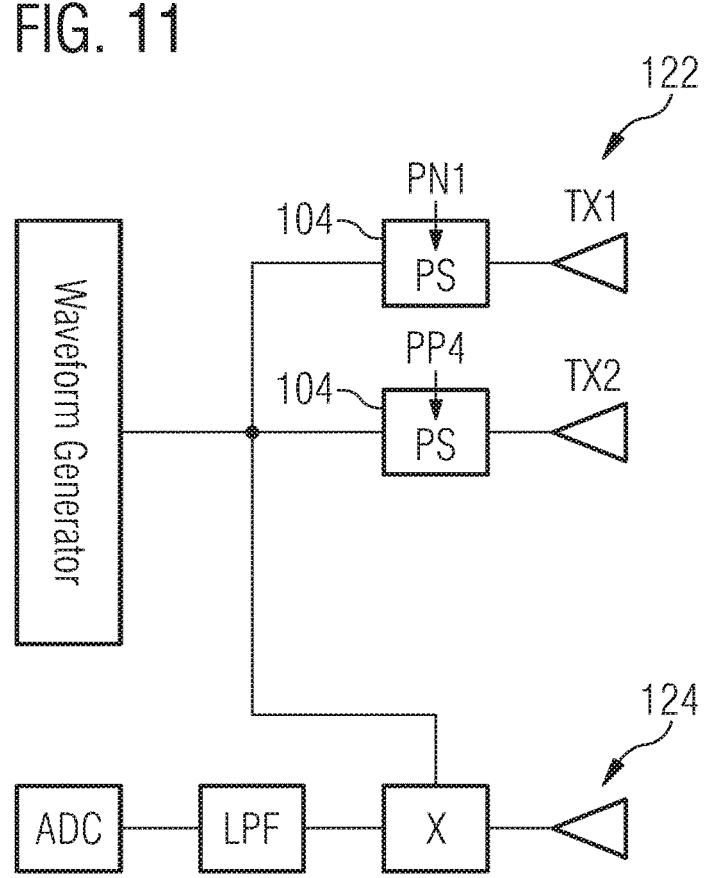
FIG. 11 is an example of two-transmitter case.
Figure 12:
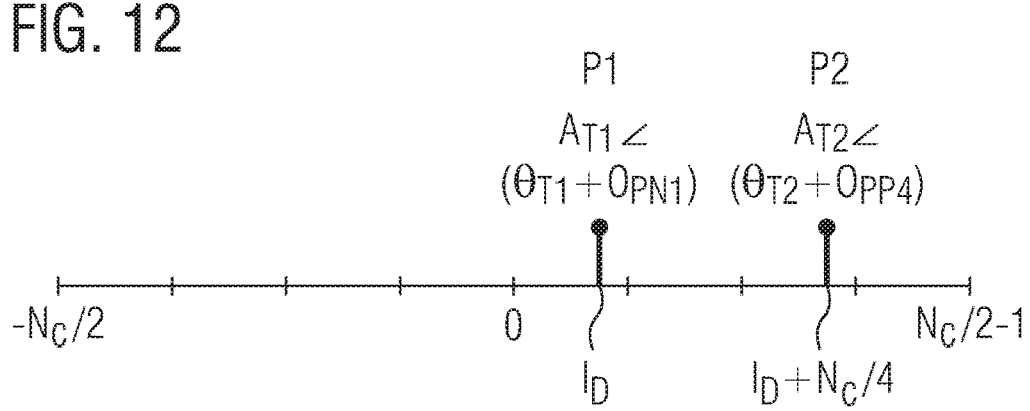
FIG. 12 shows the received signals after second FFT processing.

FIG. 11 is a two-transmitter example. A phase modulation vector of PN1 is applied to TX1 while a phase modulation vector of PP 4 is to TX2. The received signals after the second FFT processing are separated as shown in FIG. 12.

Figure 13:
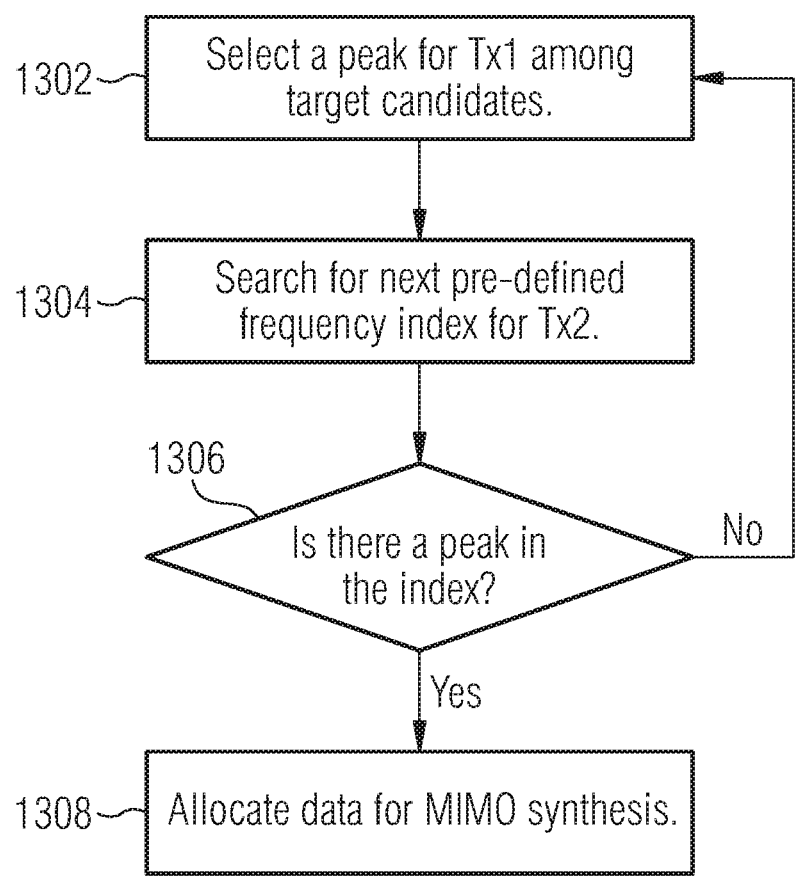
FIG. 13 is a flow diagram of an example process of allocating data for multiple-input multiple-output (MIMO) synthesis after FFT processing.

FIG. 13 is a flow diagram of an example process of allocating data for MIMO synthesis after FFT processing in the example system of FIG. 11. The peak signals of the second FFT processing whose values are above a threshold level (for example using a concept known as a constant false alarm rate (CFAR) threshold) may be taken as possible target candidates. Among the target candidates, a peak is selected for TX1 (1302). For example, a peak signal with a smaller index may be initially assumed as a reflected signal associated with TX1.

Next process is to search for a next pre-defined frequency index for TX2 (with PP4 in this example) (1304). Since the phase modulation vector is chosen to get an index difference of $N_C/4$ between TX1 and TX2, it is determined whether there is a peak in the determined index, $N_C/4$, away from TX1 (1306). If so, those two peaks can be paired for MIMO synthesis hence one complex value from TX1 and the other complex value from TX2 are consequently used for the virtual array synthesis where received channels' outputs from Tx1 and Tx2 are re-arranged for the MIMO architecture. These allocated R outputs are then used for the following DoA algorithm. (1308). If no such a paired peak is found, the process returns to 1302 to select the next peak from TX1 (e.g. changing assumption that the peak is TX2). This is repeated until all range bins are paired with the other bins as the same numbers of TX channels. For example, if 2 TXs are used for this method, all range bins are grouped with two different bins meeting defined bin distance.

Figure 14:
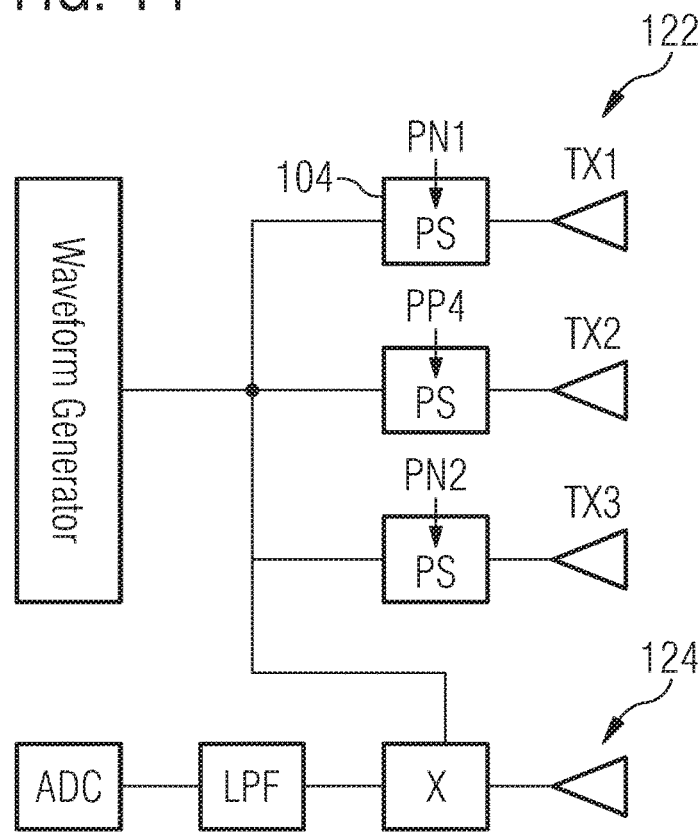
FIG. 14 shows an example system with three transmitters including phase shifters.
Figure 15:
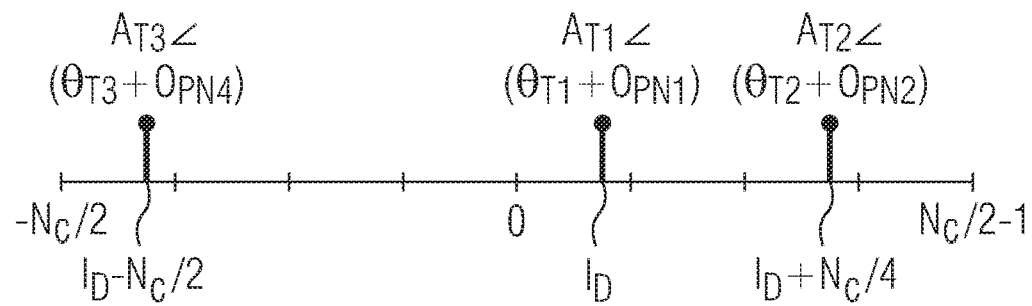
FIG. 15 shows a frequency shift result in the radar system in FIG. 14.

FIG. 14 shows an example system with three transmitters 122 including phase shifters 104. The system of FIG. 14 uses the phase modulation vectors PN1, PP4 and PN2 for the transmitters TX1, TX2, TX3, respectively. FIG. 15 shows the resulting frequency shift of the radar system shown in FIG. 14. As shown in FIG. 15, three peaks are obtained in a receiver from a single target. The MIMO synthesis process is basically the same as for the case with two transmitter shown in FIGS. 11-13. At first one peak is chosen and regarded as a signal from TX1. In this example, the interval with TX2 is determined as a $N_C/4$ and interval with TX3 as $-N_C/2$. The process determines for each transmitter branch the index at which respective peaks are expected in accordance with the phase modulation vector used for the transmitter branch. The expected index distances between the peaks are calculated for each pair of transmitter branches. The process then assigns each respective peak to a transmitter based on the expected index distances. If there are peak signals having the defined frequency index distance, the signal is collected to synthesize MIMO array. The frequency domain is from $-N_C/2$ to $N_C/2-1$. This frequency domain is the unambiguous frequency region. The ambiguous frequency region may be considered as searching for the pre-determined frequency index. For example, if the Tx1 bin is located at $N_C/2-50$ and the distance of Tx2 is designed as +70 from Tx1 then it will appear as a folding point at $-N_C/2+20$ rather than at $N_C/2+20$ which is out of unambiguous region.

Figure 16:
FIG. 16 shows an example case of synthesizing 16 channels with four transmitters and four receivers.
Figure 16:
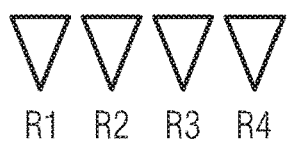
Figure 16:
Figure 16:
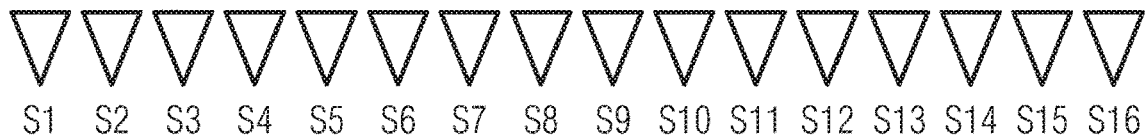
Figure 17:
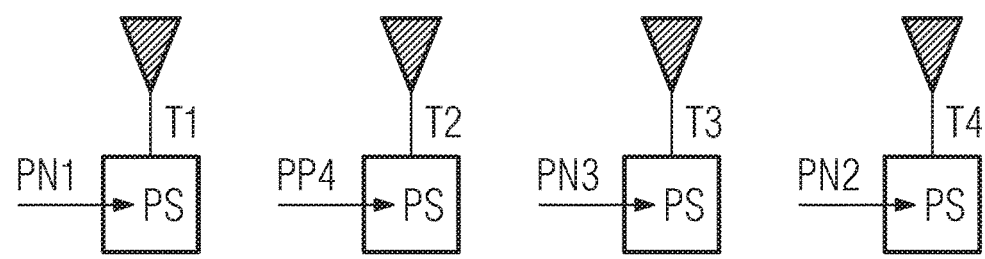
FIG. 17 shows the sets of phase modulation vectors to each transmitter in FIG. 16.
Figure 18:
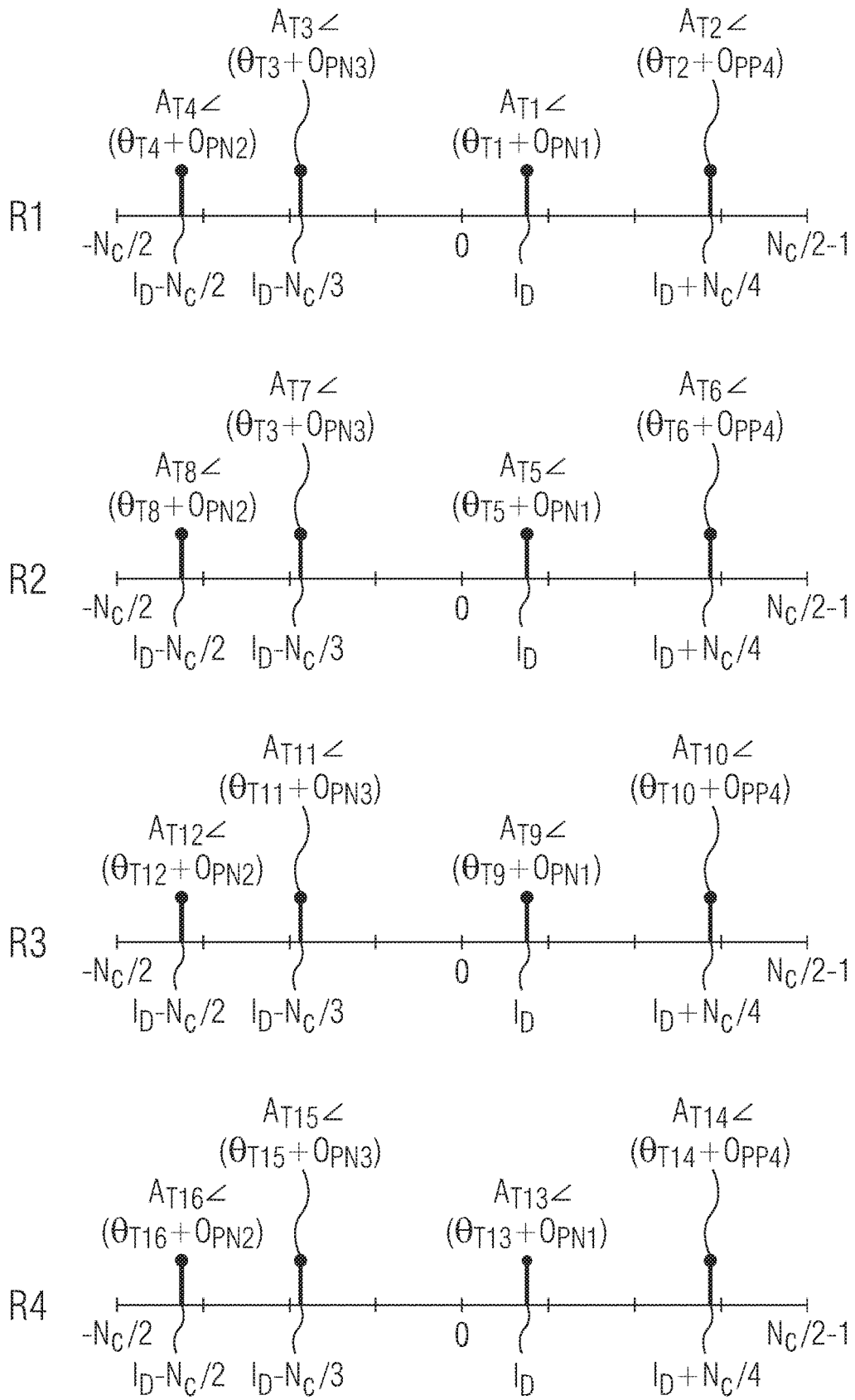
FIG. 18 shows a received signal from a single target in each receiver.
Figure 19:
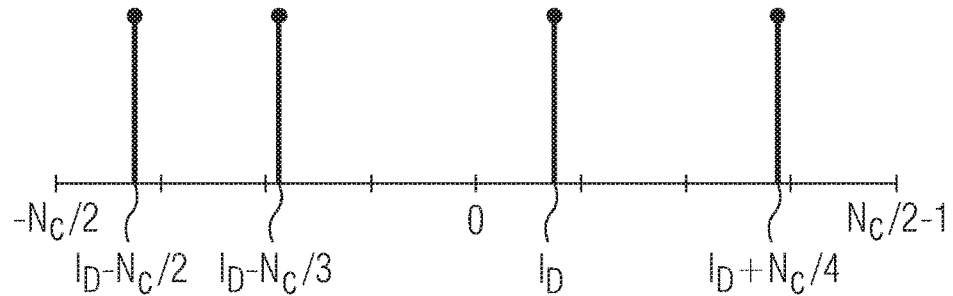
FIG. 19 shows non-coherent integration.

This procedure may be extended to MIMO configurations with any number of transmitters and receivers and any set of phase modulation vectors capable of separating the peaks in the Doppler domain, i.e. to any set of phase modulation vectors utilizing mutually different phase shifts. FIG. 16 shows an example case of synthesizing 16 channels with four transmitters and four receivers. $S_i$ is the synthesized component in the synthesized array. In this example, $S_i$ is the i-th allocated synthesized array cell from 4×(j-th of TX−1)+ k-th of RX. For example, S1 is the component resulting from a transmission via T1 and reception via R1, S2 is the component resulting from a transmission via T1 and reception via R2, S10 is the component resulting from a transmission via T3 and reception via R2, etc. FIG. 17 shows the set of phase modulation vectors (i.e. PN1, PN4, PN3, PN2) used in the transmitters T1-T4 in FIG. 16. FIG. 18 shows a received signal (after second FFT processing) from a single target in each receiver R1-R4. Each received result contains four peaks from four transmitters in its Doppler frequency domain at the corresponding range bin. Non-coherent integration may be applied for preventing loss in signal power due to non-calibration as shown in FIG. 19. The results on each receiver in FIG. 18 may be added up to get the results in FIG. 19. This is a procedure before CFAR which determines valid targets out of noise. Since there are 4 Rxs in this example, non-coherent integration or amplitude summation for 4 Rxs can increase signal power. Subsequently the process of associating the signals to transmitters may be performed similarly to the process disclosed above for 2 TX and 3 TX cases to the peaks in each receiving channel to get complex values for synthesis. A direction of arrival estimation may be then performed with the synthesized array. In multiple clutters environment where undesired interferences exist, paired peaks may not be found. For those peaks which do not have paired peaks to construct the virtual array, they may be treated without MIMO synthesis to provide at least correct angular information with lower angular resolution.

Figure 20:
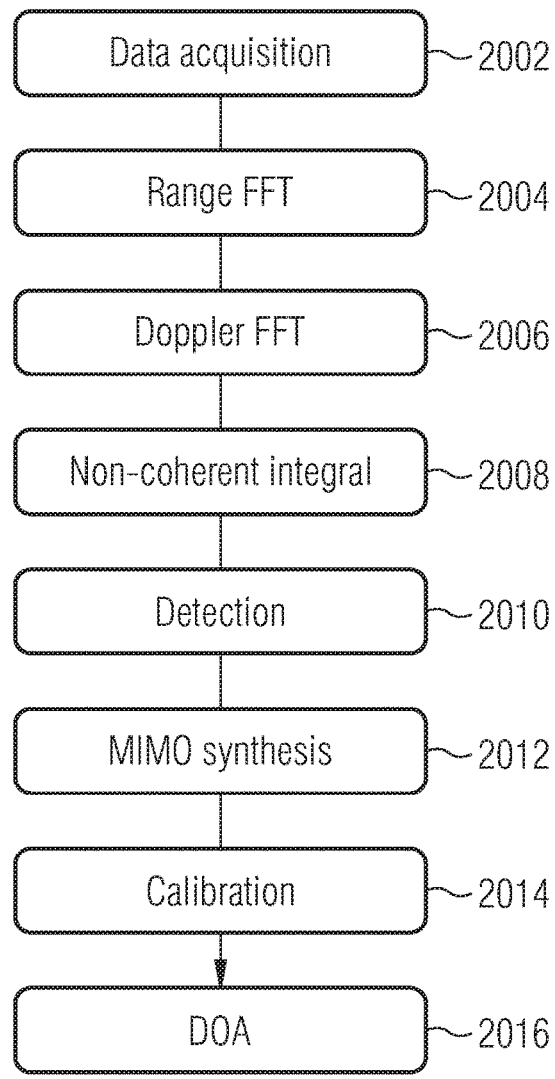
FIG. 20 is an example flow of demodulation and direction of arrival determination processing.

FIG. 20 is an example flow of demodulation and direction of arrival determination processing. Data is acquired by transmitting a phase-modulated FMCW signal via a plurality of antennas and receiving the reflected signal with at least one antenna (2002). Range FFT and Doppler FFT processing are performed as explained above (2004, 2006). After the Doppler FFT processing, non-coherent integration of the results per receivers may be performed (2008). The transmitters corresponding to each detected peak are identified (2010) and MIMO synthesis processing for building a virtual array may be performed (2012). After calibration (2014), direction of arrival may be determined (2016).

Figure 21:
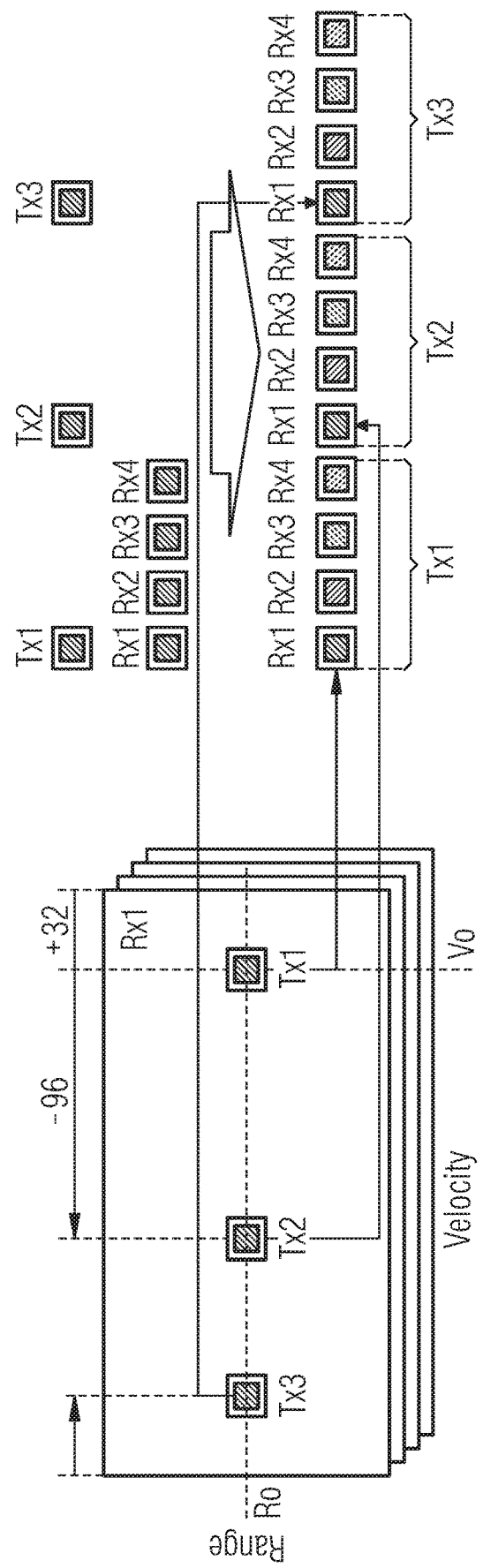
FIGS. 21, 22, 23A, and 23B show demodulation processing in accordance with one embodiment.

FIGS. 21, 22, 23A, and 23B show demodulation processing in accordance with one example. FIG. 21 shows an example range Doppler map and synthesizing MIMO channels. In this example, three transmitters (TX1-TX3) and four receivers (RX1-RX4) are used and an FMCW waveform of 256 chirps are transmitted with a set of phase-modulation vectors where the set of phase shifts utilized in the set of phase modulation vectors is asymmetrically distributed. As a result, the spectral distance between transmitters (i.e. the shifts incurred in the Doppler domain by the phase shift on the transmit branches) may be asymmetrically distributed. A set of phase shifts is asymmetrically distributed if the absolute value of the difference between respective pairs of phase shifts are not equal for all possible pairs of phase shifts. To give an example a modulation scheme is assumed wherein the shifts between the transmitters are [0, −96, +32]. For this modulation scheme, a first pair would be the pair including element 1 (delta of phase shift=0°) and element 2 (delta of phase shift=−135°). The absolute spectral value of the difference for the first pair is therefore 96 in case of 256 chirps. A second pair would be the pair including element 1 (delta of phase shift=0°) and element 3 (delta of phase shift=+45°). The absolute spectral value of the difference for the second pair is therefore 32 in case of 256 chirps. A third pair would be element 2 (delta of phase shift=−135°) and element 3 (delta of phase shift=+45°). The absolute spectral value of the difference for the third pair is therefore 128 in case of 256 chirps. Since the absolute values of the phase differences for all respective pairs are different, the phase shifts of this modulation scheme are asymmetric distributed. To give a further example, the set of [0, −96, +96] is also asymmetrically distributed since the absolute values of the differences of all three pairs of the elements are not the same, even though the absolute value of the difference between element 1 and element 2 and the difference between element 1 and element 3 are both 96. It should be noted that a symmetrically distributed set of phase shifts results after the $2^{nd}$ FFT (Doppler FFT) in symmetrically distributed peaks which are separated by a same distance. Thus, for the symmetrically distributed phase shifts it is not possible to assign the respective peaks to the transmitters. Distinguished therefrom, asymmetrically distributed phase shifts result in a set of asymmetrically distributed peaks in the Doppler domain and allow assignment of the respective peaks to transmitters. It should be noted that the numeric values are provided as an example, and different values may be selected, including the number of transmitters and receivers, the number of chirps in the FMCW wave, the frequency shifts, etc. The phase difference between the elements of the phase modulation vector in this example is determined as follows: $\Delta\varnothing_{Tx2}=360°/256\times(-96)=-135°$, $\Delta\varnothing_{Tx3}=360°/256\times(+32)=+45°$. The phase modulation vector in this example is shown in Table 5.

TABLE 5

|  | 1 | 2 | 3 | 4 | 5 | 6 | 7 | 8 | 9 | ... | 256 |
|---|---|---|---|---|---|---|---|---|---|---|---|
| TX1 (ΔØ = 0°) | 0° | 0° | 0° | 0° | 0° | 0° | 0° | 0° | 0° | ... | 0° |
| TX2 (ΔØ = −135°) | 0° | −135° | −270° | −45° | −180° | −315° | −90° | −225° | 0° | ... | −225° |
| TX3 (ΔØ = +45°) | 0° | 45° | 90° | 135° | 180° | 225° | 270° | 315° | 0° | ... | 315° |

As shown in FIG. 21, 12 virtual channels are formed by 3 transmitters and 4 receivers, and the range Doppler map (left side of FIG. 21) obtained for each receiver will show three peaks corresponding to the three transmitters that are separated by −96 and 32 indexes with reference to TX1.

Figure 22:
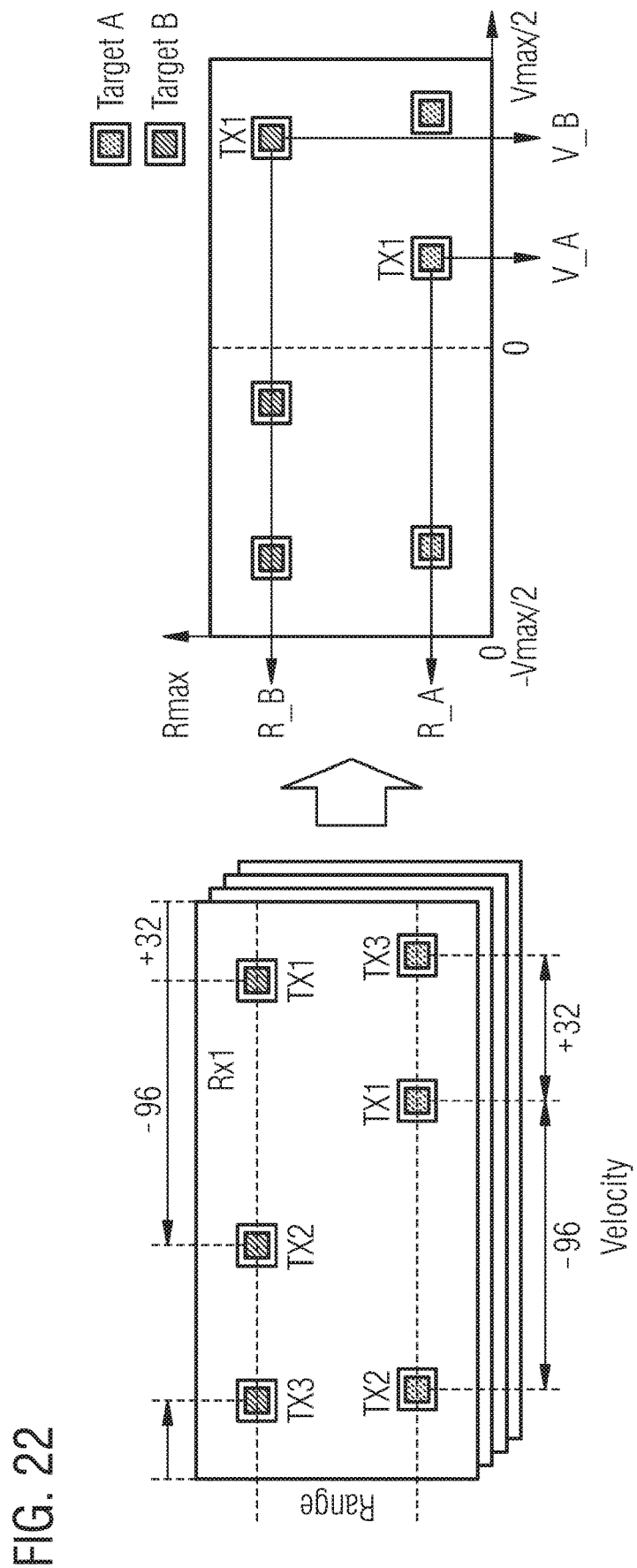

FIG. 22 shows a range Doppler map from two targets (target A and target B) and determination of frequency bin from TX1. Since in this example three transmitters are used three pairs of peaks will be detected from each target as shown in FIG. 22. Two frequency bins are located −96 bins and +32 bins away from the reference on the same range bin in this example. Among the three peaks for each target, the TX1 peak is determined as explained above, and the range and velocity value of the object may be determined from the TX1 data alone. The usage of the non-phase modulated TX1 signal for determining range and velocity allows a calculation of the range and velocity in the conventional way. Furthermore, usage of the non-phase modulated TX1 signal allows the determining of range and velocity in an easier manner compared to usages of phase-modulated signals such as the TX2 or TX3 signals. Alternatively, any TX data may be used for determination of the range and velocity of a target.

Figure 23A:
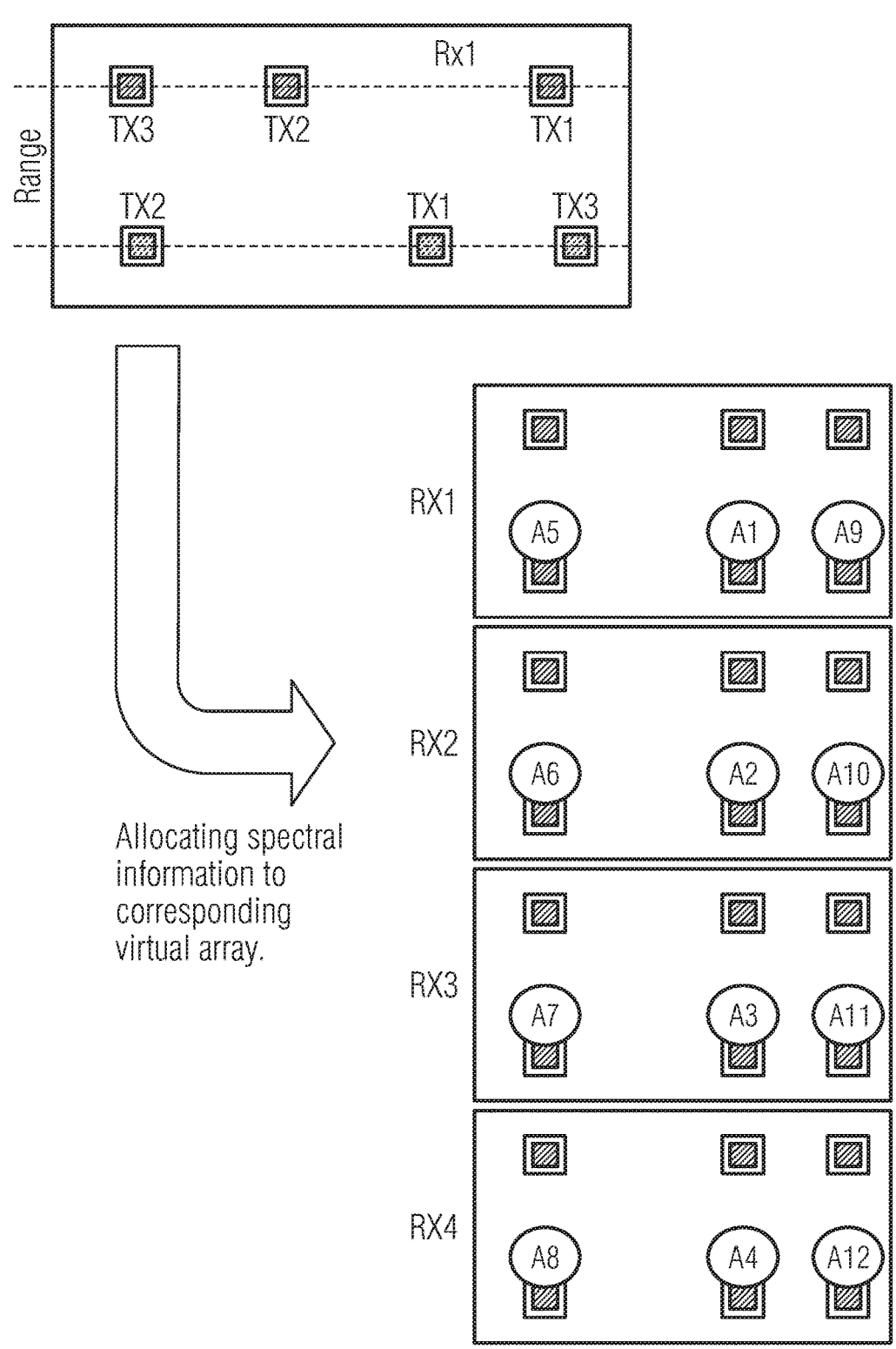
Figure 23B:
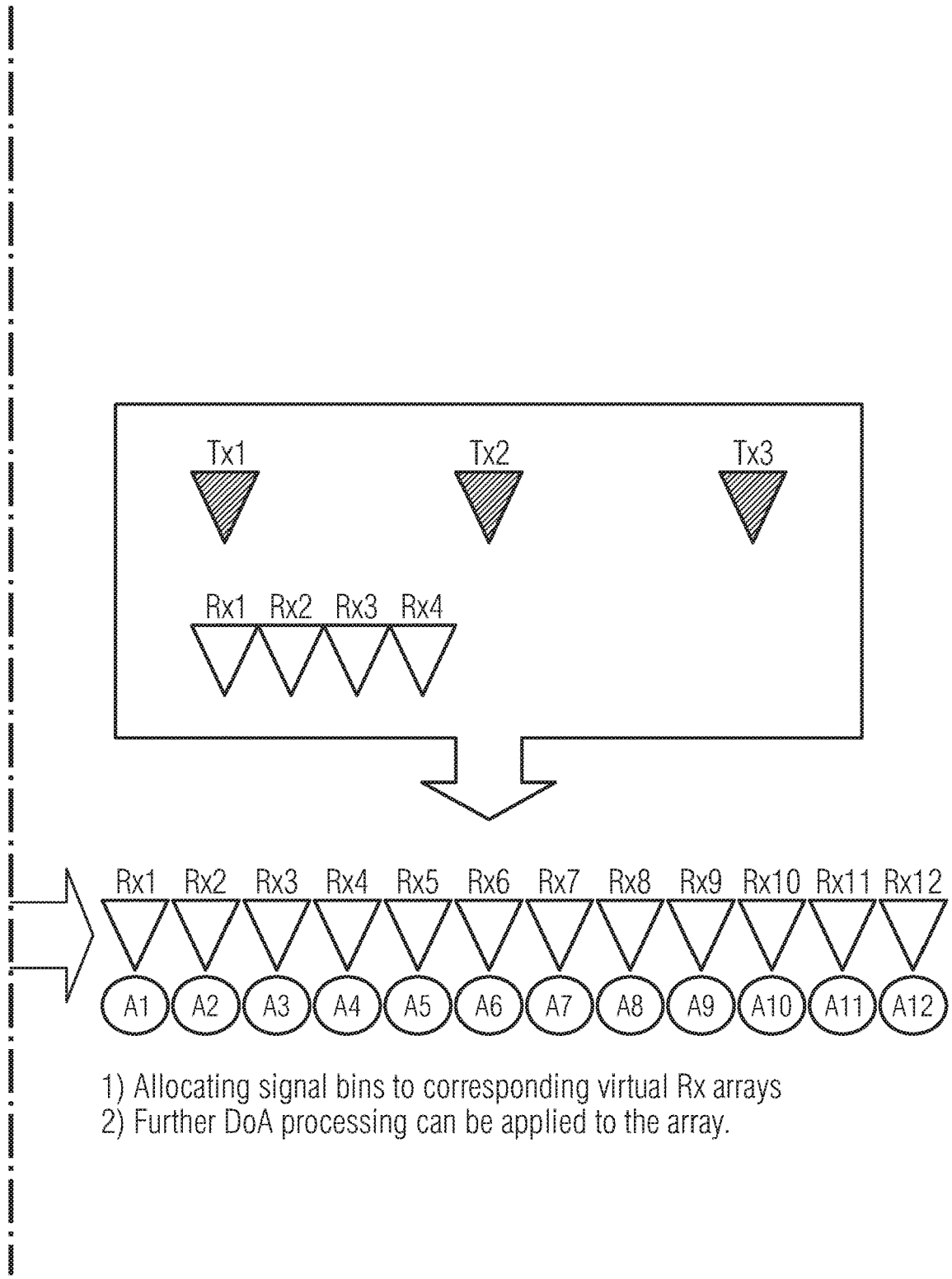

FIGS. 23A and 23B show synthesis of MIMO virtual array in one embodiment. FIGS. 23A and 23B share a common border, indicated by a vertical dashed line. The spectral information may be allocated to a virtual array. FIGS. 23A and 23B shows allocation of the 12 spectral data obtained by 4×3 physical array to 12 virtual arrays. After allocating the signal bins to corresponding virtual RX arrays, direction of arrival (i.e. angle of direction) estimation processing may be performed.

Figure 24:
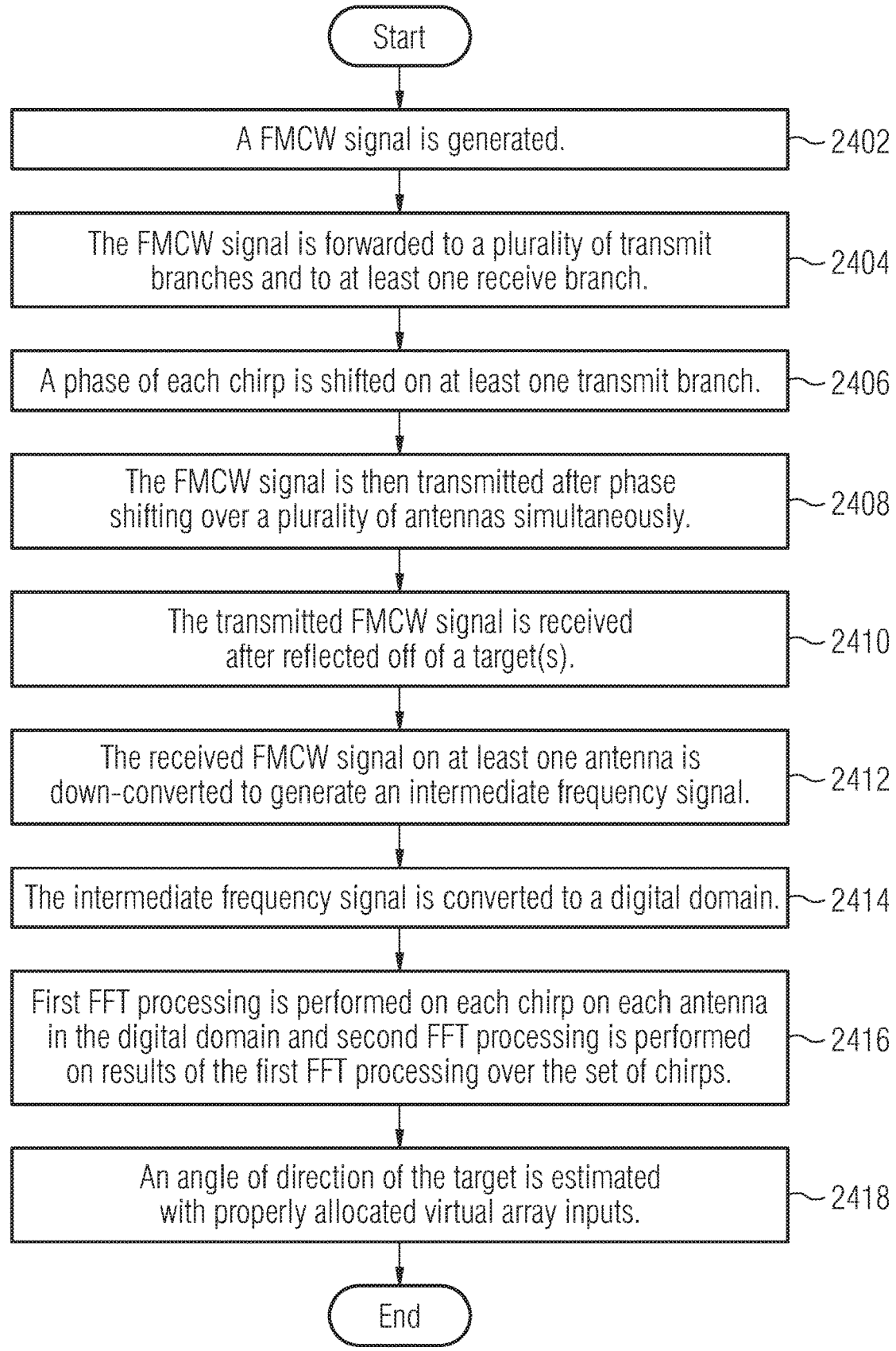
FIG. 24 shows a flow of example process of detecting a target using FMCW radar in accordance with one embodiment.

FIG. 24 shows a flow of an example process of detecting a target using FMCW radar in accordance with one embodiment. An FMCW signal is generated (2402). The FMCW signal includes a set of chirps repeated for a predetermined number of times. The FMCW signal is forwarded to a plurality of transmit branches and to at least one receive branch (2404). A phase of each chirp is shifted on at least one transmit branch (2406). Phases of FMCW chirps transmitted via a first transmit branch are shifted in accordance with a first set of regularly spaced phases (first phase modulation vector) and phases of FMCW chirps transmitted via a second transmit branch are shifted in accordance with a second set of regularly spaced phases (second phase modulation vector). The first set of regularly spaced phases may have first phase differences and the second set of regularly spaced phases may have second phase differences. The first phase differences are different from the second phase differences. As explained above, the concept can be extended to any number of transmitters. Therefore, according to some embodiments, phases of FMCW chirps transmitted via a third transmit branch are shifted in accordance with a third set of regularly spaced phases (third phase modulation vector) and/or phases of FMCW chirps transmitted via a fourth transmit branch are shifted in accordance with a fourth set of regularly spaced phases (fourth phase modulation vector). The first, second, third and fourth phase differences are selected to be respectively different.

The FMCW signal is then transmitted after phase shifting over a plurality of antennas simultaneously (2408). The transmitted FMCW signal is received after reflected off of a target(s) (2410). The received FMCW signal on at least one antenna is down-converted to generate an intermediate frequency signal (2412). The intermediate frequency signal is converted to a digital domain (2414). First FFT processing is performed on each chirp for each receive antenna in the digital domain and second FFT processing is performed on results of the first FFT processing over the set of chirps (2416). An output of the FFT processing in each Rx channel is processed to determine corresponding Tx. Consequently, all the 2D FFT outputs are allocated to the virtual array such that bins from Tx1Rx1, Tx1Rx2, Tx1Rx3, Tx1Rx4, Tx2Rx1, Tx2Rx2, Tx2Rx3, Tx2Rx4, in the 2Tx+4Rx case. An angle of direction of the target can be estimated with properly allocated virtual array inputs. (2418).

The embodiments provide a radar system for high resolution. The embodiments provide an innovative modulation and demodulation scheme for concurrent MIMO FMCW radar based on pre-defined spectral distance in the Doppler domain between different transmitters. This enables phase modulation without changing FMCW waveform for large number of concurrent transmitting signals. Different phase modulation may generate different spectral distance in two-dimensional (2D) FFT domain. This provides clear indication of signals from respective transmitters.

The phase modulation scheme of the embodiments provides 1-to-1 mapping of reflected signals from different transmitters on 2D FFT spectrum, thus no mirror image arises in a spectral domain. Reflected signals induced from concurrently exposed transmitters can be easily identified by using the spectral distance relation which is already decided from the phase modulation scheme.

Asymmetric spectral distance between each transmitter and a reference transmitter may be designed so that allocation of MIMO virtual array can be performed in a straightforward way. The embodiments may enable development of high resolution radar with minimal effort and cost.

Another embodiment is a computer program having a program code for performing at least one of the methods described herein, when the computer program is executed on a computer, a processor, or a programmable hardware component. Another embodiment is a machine-readable storage including machine readable instructions, when executed, to implement a method or realize an apparatus as described herein. A further embodiment is a machine-readable medium including code, when executed, to cause a machine to perform any of the methods described herein.

The aspects and features mentioned and described together with one or more of the previously detailed embodiments and figures, may as well be combined with one or more of the other embodiments in order to replace a like feature of the other embodiment or in order to additionally introduce the feature to the other embodiment.

Embodiments may further be or relate to a computer program having a program code for performing one or more of the above methods, when the computer program is executed on a computer or processor. Steps, operations or processes of various above-described methods may be performed by programmed computers or processors. Embodiments may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further embodiments may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all embodiments recited herein are principally intended expressly to be only for pedagogical purposes to aid the reader in understanding the principles of the disclosure and the concepts contributed by the inventor(s) to furthering the art. All statements herein reciting principles, aspects, and embodiments of the disclosure, as well as specific embodiments thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some embodiments a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A radar system, comprising:
a first transmitter branch configured to transmit a first frequency-modulated continuous wave (FMCW) signal via a first transmit antenna, the first FMCW signal having a first set of chirps repeated a first predetermined number of times, the first set of chirps having a first phase setting such that phase values of consecutive chirps in the first set of chirps differ by a first phase difference,
a second transmitter branch configured to transmit a second FMCW signal via a second transmit antenna, the second FMCW signal having a second set of chirps repeated a second predetermined number of times, the second set of chirps having a second phase setting such that phase values of consecutive chirps in the second set of chirps differ by a second phase difference,
a third transmitter branch configured to transmit a third FMCW signal via a third transmit antenna, the third FMCW signal having a third set of chirps repeated for a third predetermined number of times, the third set of chirps having a third phase setting such that phase values of consecutive chirps in the third set of chirps differ by a third phase difference,
wherein the first phase difference, the second phase difference, and the third phase difference are different phase differences, and
wherein the first phase difference, the second phase difference, and the third phase difference are asymmetrically distributed relative to each other.

2. The radar system of claim 1, wherein the first FMCW signal, the second FMCW signal, and the third FMCW signal are transmitted in parallel.

3. The radar system of claim 1, further comprising:
a waveform generator configured to generate an initial FMCW signal and simultaneously provide the initial FMCW signal to the first transmitter branch, the second transmitter branch, and the third transmitter branch.

4. The radar system of claim 3, wherein the first transmitter branch comprises a first phase shifter configured to receive the initial FMCW signal and output the first FMCW signal based on the initial FMCW signal, the second transmitter branch comprises a second phase shifter configured to receive the initial FMCW signal and output the second FMCW signal based on the initial FMCW signal, and the third transmitter branch comprises a third phase shifter configured to receive the initial FMCW signal and output the third FMCW signal based on the initial FMCW signal.

5. The radar system of claim 3, wherein the first transmitter branch comprises a first phase shifter configured to receive the initial FMCW signal and output the first FMCW signal based on the initial FMCW signal, the second transmitter branch comprises a second phase shifter configured to receive the initial FMCW signal and output the second FMCW signal based on the initial FMCW signal, and the third transmitter branch is configured to receive the initial FMCW signal and transmit the initial FMCW signal as the third FMCW signal.

6. The radar system of claim 3, wherein phases of each chirp transmitted via the third transmitter branch are not phase-modulated with respect to the initial FMCW signal.

7. The radar system of claim 1, wherein the first phase difference, the second phase difference, and the third phase difference are set to incur specific shifts to peaks corresponding to different transmitter branches in a Doppler domain, and the specific shifts incurred in the Doppler domain are asymmetrically distributed.

8. The radar system of claim 7, wherein Doppler bins from different transmitter branches have a different spectral distance to each other.

9. The radar system of claim 1, further comprising:
a receiver circuit comprising:
at least one mixer configured to down-convert a received signal received on at least one receive antenna to generate an intermediate frequency signal, wherein the received signal comprises a fourth set of chirps derived from the first set of chirps, the second set of chirps, and the third set of chirps;
an analog-to-digital converter configured to convert the intermediate frequency signal to a digital domain;
a fast Fourier transform (FFT) processor configured to perform first FFT processing on each chirp of the fourth set of chirps received on each of the at least one receive antenna in the digital domain and perform second FFT processing on results of the first FFT processing over the fourth set of chirps; and
a processor configured to process an output of the FFT processor to determine an angle of direction of a target based on range Doppler map bins containing peaks with the first, the second, and the third phase differences.

10. The radar system of claim 9, wherein the processor is configured to determine a velocity of the target by identifying a first peak in a range Doppler map corresponding to a predetermined transmitter branch.

11. The radar system of claim 10, wherein the predetermined transmitter branch is a transmitter branch in which phases of each chirp are not phase-modulated.

12. The radar system of claim 9, wherein the first phase difference, the second phase difference, and the third phase difference are set to incur specific shifts to peaks corresponding to different transmit branches in a Doppler domain after the second FFT processing.

13. The radar system of claim 12, wherein the processor is further configured to determine an angle of direction of the target based on an index difference between peaks in the Doppler domain.

14. The radar system of claim 12, wherein the specific shifts incurred in the Doppler domain are asymmetrically distributed such that Doppler bins from different transmitters have a different spectral distance to each other.

15. A method, comprising:
transmitting, via first transmitter branch, a first frequency-modulated continuous wave (FMCW) signal via a first transmit antenna, the first FMCW signal having a first set of chirps repeated a first predetermined number of times, the first set of chirps having a first phase setting such that phase values of consecutive chirps in the first set of chirps differ by a first phase difference,
transmitting, via second transmitter branch, a second FMCW signal via a second transmit antenna, the second FMCW signal having a second set of chirps repeated a second predetermined number of times, the second set of chirps having a second phase setting such that phase values of consecutive chirps in the second set of chirps differ by a second phase difference,
transmitting, via third transmitter branch, a third FMCW signal via a third transmit antenna, the third FMCW signal having a third set of chirps repeated for a third predetermined number of times, the third set of chirps having a third phase setting such that phase values of consecutive chirps in the third set of chirps differ by a third phase difference, wherein the first phase difference, the second phase difference, and the third phase difference are different phase differences, and wherein the first phase difference, the second phase difference, and the third phase difference are asymmetrically distributed relative to each other.

16. The radar system of claim 15, wherein the first FMCW signal, the second FMCW signal, and the third FMCW signal are transmitted in parallel.

17. The radar system of claim 15, further comprising:
receiving a fourth FMCW signal based on the first FMCW signal, the second FMCW signal, and the third FMCW signal reflected off of a target, the fourth FMCW having a fourth set of chirps derived from the first set of chirps, the second set of chirps, and the third set of chirps;
down-converting, by at least one mixer, the fourth FMCW signal to generate an intermediate frequency signal;
converting, by an analog-to-digital converter, the intermediate frequency signal to a digital domain;
performing, by a fast Fourier transform (FFT) processor, first FFT processing on each chirp of the fourth FMCW signal in the digital domain and second FFT processing on results of the first FFT processing over the fourth set of chirps; and
processing, by a processor, an output of the second FFT processing to determine an angle of direction of the target based on range Doppler map bins containing peaks with the first, the second, and the third phase differences.

18. The radar system of claim 17, wherein the phases of chirps on the first, the second, and the third transmitter branches are shifted to incur specific shifts to peaks corresponding to different transmitter branches in a Doppler domain after the second FFT processing.

19. The radar system of claim 18, further comprising:
determining an angle of direction of the target based on an index difference between peaks in the Doppler domain.

20. The radar system of claim 18, wherein the specific shifts incurred in the Doppler domain are asymmetrically distributed such that Doppler bins from different transmitters have a different spectral distance to each other.

* * * * *

UNITED STATES PATENT AND TRADEMARK OFFICE
CERTIFICATE OF CORRECTION

| | |
|---|---|
| PATENT NO. | : 12,019,142 B2 |
| APPLICATION NO. | : 17/874797 |
| DATED | : June 25, 2024 |
| INVENTOR(S) | : Sang Ho Nam et al. |

Page 1 of 1

It is certified that error appears in the above-identified patent and that said Letters Patent is hereby corrected as shown below:

In the Claims

In Claim 1, Column 17, Line 17, "by a second phase difference," should be changed to --by a second phase difference, and--.

In Claim 15, Column 18, Line 59, "by a second phase difference," should be changed to --by a second phase difference, and--.

In Claim 16, Column 19, Line 7, "The radar system of claim 15" should be changed to --"The method of claim 15"--.

In Claim 17, Column 19, Line 10, "The radar system of claim 15" should be changed to --"The method of claim 15"--.

In Claim 18, Column 20, Line 9, "The radar system of claim 17" should be changed to --"The method of claim 17"--.

In Claim 19, Column 20, Line 14, "The radar system of claim 18" should be changed to --"The method of claim 18"--.

In Claim 20, Column 20, Line 17, "The radar system of claim 18" should be changed to --"The method of claim 18"--.

Signed and Sealed this
Third Day of September, 2024

Katherine Kelly Vidal
*Director of the United States Patent and Trademark Office*